(12) United States Patent
Betzig et al.

(10) Patent No.: US 8,730,573 B2
(45) Date of Patent: May 20, 2014

(54) ADAPTIVE OPTICS MICROSCOPY WITH PHASE CONTROL OF BEAMLETS OF A LIGHT BEAM

(75) Inventors: Eric Betzig, Leesburg, VA (US); Na Ji, Leesburg, VA (US)

(73) Assignee: Howard Hughes Medical Institute, Ashburn, VA (US)

( * ) Notice: Subject to any disclaimer, the term of this patent is extended or adjusted under 35 U.S.C. 154(b) by 274 days.

(21) Appl. No.: 12/833,767

(22) Filed: Jul. 9, 2010

(65) Prior Publication Data

US 2011/0006231 A1    Jan. 13, 2011

Related U.S. Application Data

(60) Provisional application No. 61/224,102, filed on Jul. 9, 2009, provisional application No. 61/247,929, filed on Oct. 1, 2009, provisional application No. 61/263,614, filed on Nov. 23, 2009, provisional application No. 61/265,225, filed on Nov. 30, 2009.

(51) Int. Cl.
*G01D 5/30* (2006.01)
*G02B 21/00* (2006.01)

(52) U.S. Cl.
USPC .................. 359/385; 359/388; 250/461.2

(58) Field of Classification Search
USPC ............... 250/458.1–461.2; 356/317, 318; 359/368, 385
See application file for complete search history.

(56) References Cited

U.S. PATENT DOCUMENTS

| | | | |
|---|---|---|---|
| 5,801,881 A | 9/1998 | Lanni et al. | |
| 6,483,641 B1 | 11/2002 | MacAulay | |
| 6,750,457 B2 | 6/2004 | Heffelfinger et al. | |
| 6,771,417 B1 | 8/2004 | Wolleschensky et al. | |
| 6,863,406 B2 | 3/2005 | Grier et al. | |
| 6,995,810 B2 | 2/2006 | Melton | |
| 7,079,262 B2 | 7/2006 | Jones et al. | |
| 7,095,556 B2 | 8/2006 | Iketaki et al. | |
| 7,180,661 B2 * | 2/2007 | Sasaki | 359/385 |
| 7,359,117 B2 * | 4/2008 | Shimizu et al. | 359/388 |
| 7,423,745 B2 | 9/2008 | Moribe et al. | |
| 7,460,248 B2 | 12/2008 | Kurtz et al. | |
| 7,755,832 B2 | 7/2010 | MacAulay | |
| 8,217,992 B2 | 7/2012 | Bewersdorf et al. | |
| 2002/0154398 A1 | 10/2002 | Wolleschensky et al. | |
| 2003/0161038 A1 | 8/2003 | Tobben et al. | |

(Continued)

FOREIGN PATENT DOCUMENTS

| | | |
|---|---|---|
| WO | 97/31276 A1 | 8/1997 |
| WO | 2011006106 | 1/2011 |
| WO | 2013010151 | 1/2013 |

OTHER PUBLICATIONS

International Search Report and Written Opinion received for PCT Patent Application No. PCT/US2010/41582, mailed on Sep. 30, 2010, 17 Pages.

(Continued)

*Primary Examiner* — Tony Ko
(74) *Attorney, Agent, or Firm* — Brake Hughes Bellermann LLP

(57) ABSTRACT

Microscopy techniques in which a rear pupil of an optical system is segmented and the segments are individually controlled with a wavefront modulating device to control the direction and phase of individual beamlets of an excitation or emission beam in the optical system, thereby providing an adaptive optics correction to sample and system induced aberrations.

26 Claims, 12 Drawing Sheets

(56) References Cited

U.S. PATENT DOCUMENTS

| | | |
|---|---|---|
| 2004/0257529 A1 | 12/2004 | Thomas |
| 2006/0058682 A1 | 3/2006 | Miller et al. |
| 2007/0121201 A1 | 5/2007 | Sander |
| 2007/0188856 A1 | 8/2007 | MacAulay |
| 2007/0263226 A1 | 11/2007 | Kurtz et al. |
| 2008/0316571 A1 | 12/2008 | MacAulay |
| 2009/0046298 A1 | 2/2009 | Betzig |
| 2009/0137990 A1* | 5/2009 | Sheinis .............................. 606/5 |
| 2009/0316141 A1 | 12/2009 | Feldkhun |
| 2010/0102249 A1 | 4/2010 | Akselrod et al. |
| 2010/0301232 A1 | 12/2010 | Erlbacher et al. |
| 2011/0006231 A1 | 1/2011 | Betzig et al. |
| 2011/0278442 A1 | 11/2011 | Grier et al. |
| 2013/0181143 A1 | 7/2013 | Betzig et al. |

OTHER PUBLICATIONS

Moreno-Barriusco, E., et al., "Laser Ray Tracing versus Hartmann-Shack sensor for measuring optical abberrations in the human eye", Journal of the Optical Society of America A, Optical Society of America, vol. 17 No. 06, Jun. 6, 2000, pp. 974-985.

Navarro, R., et al., "Laser-Ray Method for Optical Testing", Optics Letters, OSA, Optical Society of America, vol. 24 No. 14, Jul. 15, 1999, pp. 951-953.

Booth, J. M., "Adaptive optics in microscopy", Philosophical Transactions of the Royal Society: A Mathematical, Physical and Engineering Sciences, vol. 365, Issue 1861, Sep. 13, 2007, pp. 2829-2842.

Ji et al., "Adaptive optics via pupil segmentation for high-resolution imaging in biological tissues", Nature Methods vol. 7, 2009, pp. 141-147.

Vellekoop et al., "Focusing coherent light through opaque strongly scattering media", Optics Letters vol. 32 No. 16, 2007, pp. 2309-2311.

Wright et al., "Dynamic Closed-Loop System for Forcus Tracking Using a Spatial Light Modulator and a Deformable Membrane Mirror", Institute of Photonics, University of Strathclyde, 106 Rottenrow, Glasgow, G4—NW, Scotland, Optics Express 222, vol. 14, No. 1, Jan. 9, 2006, 7 Pages.

Webb et al., "Measurement of Ocular Local Wavefront Distortion with a Spatially Resolved Refractometer", Applied Optics, vol. 31, No. 19, Jul. 1, 1992, 9 pages.

Webb et al., "SSR (spatially resolved refactormeter): A Null-Seeking Aberrometer", Applied Optics, vol. 42, No. 4, Feb. 1, 2003, 9 Pages.

Leray, A. et al., "Enhanced Background Rejection in Thick Tissue with Differential-Aberration Two-Photon Microscopy", Biophysical Journal, vol. 94, Feb. 2008, 10 Pages.

Lombardo et al., "New Methods and Techniques for Sensing the Wave Aberrations of Human Eyes", Clin Exp Optom; 92:3, Dec. 24, 2009, pp. 176-186.

He et al., "Measurement of the Wave-front Aberration of the Eye by a Fast Psychophysical Procedure", vol. 15, No. 9, J. Opt. Soc. Am A., Sep. 1998, pp. 2449-2456.

Sebag et al., "High-resolution Imaging using Pupil Segmentation", vol. 7, No. 7, J. Opt.Soc. Am. A, Jul. 1990, 6 Pages.

Liu et al., "Dynamic Focusing with Radial Gratings for in Vivo High Resolution Imaging", Proc. of SPIE vol. 6847 684718-1, Coherence Domain Optical Methods and Optical Coherence Tomography in Biomedicine XII, 2008, 8 Pages.

Kner et al., "Applying Adaptive Optics to Three-Dimensional Wide-Field Microscopy", 12 pages.

International Search Report and Written Opinion received for PCT Patent Application No. PCT/US2012/046815, mailed on Sep. 26, 2012, 8 pages.

Birch et al.,"Dynamic Complex Wave-Front Modulation with an Analog Spatial Light Modulator", Optical Society of America. Optics Letters, vol. 26, No. 12, Jun. 15, 2001, pp. 920-922.

Booth et al., "Methods for the Characterization of Deformable Membrane Mirrors", Optical Society of America, Applied Optics, vol. 44, No. 24, Aug. 20, 2005, pp. 5131-5139.

Hanser et al., "Phase-Retrieved Pupil Functions in Wide-Field Fluorescence Microscopy", The Royal Microscopical Society, Journal of Microscopy, vol. 216, Pt, Oct. 1, 2004, pp. 32-48.

Helmchen et al., "Deep Tissue Two-Photon Microscopy", Nature Publishing Group, Nature Methods, vol. 2, No. 12, Dec. 2005, pp. 932-940.

Schwertner et al., "Measurement of Specimen-Induced Aberrations of Biological Samples Using Phase Stepping Interferometry", The Royal Microscopical Society, Journal of Microscopy, vol. 213, Pt, Jan. 1, 2004, pp. 11-19.

Neil et al., "New Modal Wave-Front Sensor: A Theoretical Analysis", Optical Society of America, J. Opt. Soc. Am. A, vol. 17, No. 6, Jun. 2000, pp. 1098-1107.

Booth et al., "New Modal Wave-Front Sensor: Application to Adaptive Confocal Fluorescence Microscopy and Two-Photon Excitation Fluorescence Microscopy", Optical Society of America, J. Opt. Soc. Am. A, vol. 19, No. 10, Oct. 2002, pp. 2112-2120.

Schwertner et al., "Spherical Aberration Correction System Using an Adaptive Optics Deformable Mirror", Elsevier B.V. Science Direct, Optics Communications 263, 2006, pp. 147-151.

Vellekoop et al., "Phase Control Algorithms for Focusing Light Through Turbid Media", Elsevier B.V., Science Direct, Optics Communications 281, 2008, pp. 3071-3080.

Schwertner et al., "Characterizing Specimen Induced Aberrations for High NA Adaptive Optical Microscopy", Optical Society of America, Optics Express 6540, vol. 12, No. 26, Dec. 27, 2004, 13 Pages.

Debarre et al., "Image Based Adaptive Optics Through Optimisation of Low Spatial Frequencies", Optical Society of America, Optics Express 8176, vol. 15, No. 13, Jun. 25, 2007, 15 Pages.

Hanser et al., "Phase Retrieval for High-Numerical-Aperture Optical Systems", Optical Society of America, Optics Letters, vol. 28, No. 10, May 15, 2003, pp. 801-803.

Booth, Martin J., "Wavefront Sensorless Adaptive Optics for Large Aberrations", Optical Society of America, Optics Letters, vol. 32, No. 1, Jan. 1, 2007, pp. 5-7.

Booth, Martin J., "Adaptive Optics in Microscopy", Philosophical Transactions of The Royal Society, 365, Sep. 13, 2007, pp. 2829-2843.

Booth et al., "Adaptive Aberration Correction in a Confocal Microscope", PNAS, vol. 99, No. 9, Apr. 30, 2002, pp. 5788-5792.

Schwiegerling et al., "Historical Development of the Shack-Hartmann Wavefront Sensor", 5 Pages.

Chen et al., "Focal Modulation Microscopy", Optical Society of America, Optics Express 18764, vol. 16, No. 23, Nov. 10, 2008, 6 Pages.

Vellekoop, Ivo Micha, "Controlling the Propagation of Light in Disordered Scattering Media", ISBN: 978-90-365-2663-0, Nov. 11, 1977, 144 Pages.

Cui, M., "Parallel Wavefront Optimization Method for Focusing Light through Random Scattering Media", Optics Letters, vol. 36, No. 6, 2011, pp. 870-872.

Hardy, J. W., "Adaptive Optics for Astronomical Telescopes", Oxford University Press, Jul. 30, 1998, 448 Pages.

Helmbrecht et al., "MEMS DM Development at Iris AO Inc.", Inc. Proc. Spie, vol. 7931 No. 1, 2011.

Panagopoulou et al., "Zonal Matrix Iterative Method for Wavefront Reconstruction from Gradient Measurements", J. Refract. Surg. vol. 21 No. 5, 2005, pp. S563-S569.

International Preliminary Report on Patentability received for PCT Patent Application No. PCT/US2010/41582, mailed on Jan. 19, 2012, 10 Pages.

Tyson, R. K., "Principles of Adaptive Optics", San Diego, CA: Academic Press, Inc., Sep. 16, 2010, 299 Pages.

Ji, Na "Advances in the Speed and Resolution of Light Microscopy", Current Opinion in Neurobiology, www.sciencedirect.com, (2008), 12 pages.

(56) References Cited

OTHER PUBLICATIONS

Girkin, John M., et al., "Adaptive Optice for Deeper Imaging of Biological Samples", Current Opinion in Biotechnology, www.sciencedirect.com, (2998), 5 pages.

Notice of Allowance for U.S. Appl. No. 13/550,250, mailed Jun. 12, 2013, 14 pages.

Notice of Allowance for U.S. Appl. No. 13/550,250, mailed Sep. 4, 2013, 14 pages.

Cui, "Parallel Wavefront Optimization Method for Focusing Light Through Random Scattering Media", Optics Letter, vol. 36, No. 6, Mar. 15, 2011, 3 pages.

Cui, "A High Speed Wavefront Determination Method Based on Spatial Frequency Modulations for Focusing Light Through Random Scattering Media", Optical Society of America, vol. 19, No. 6, Feb. 14, 2011, 7 pages.

\* cited by examiner

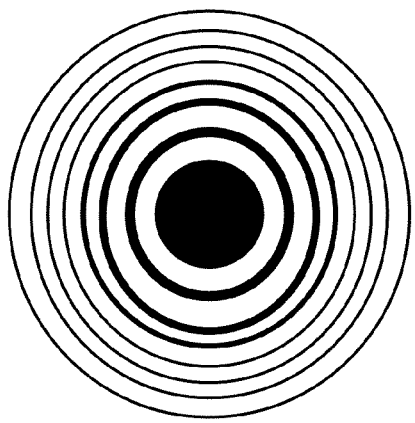
FIG 9A
A
FIG 9B
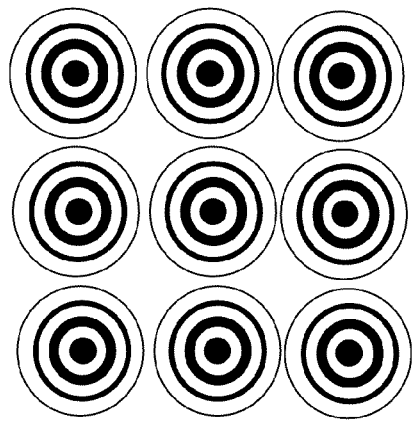
FIG. 9C
| A | A | A |
| A | A | A |
| A | A | A |
FIG. 9D

US 8,730,573 B2

ADAPTIVE OPTICS MICROSCOPY WITH PHASE CONTROL OF BEAMLETS OF A LIGHT BEAM

CROSS-REFERENCE TO RELATED APPLICATIONS

This application claims the priority of U.S. Provisional Patent Application Nos. 61/224,102, filed Jul. 9, 2009, entitled "Adaptive Optics Using Pupil Segmentation"; 61/247,929, filed Oct. 1, 2009, entitled "Adaptive Optics Using Pupil Segmentation"; 61/263,614, filed Nov. 23, 2009, entitled "Adaptive Optics Using Pupil Segmentation"; and 61/265,225, filed Nov. 30, 2009, entitled "Adaptive Optics in Widefield Microscopy." The subject matter of each of these earlier filed applications is hereby incorporated by reference.

TECHNICAL FIELD

This disclosure relates to microscopy and, in particular, to microscopy with adaptive optics.

BACKGROUND

Since its invention centuries ago, light microscopy has evolved through many incarnations with distinct contrast mechanisms and hardware implementations. However, the fundamental motivation for its use has remained the same—it can resolve features that are not distinguishable by the naked eye. As a result, the push for higher resolution has been the focus of light microscopy development in recent years and several methods have been demonstrated to break the diffraction limit of conventional light microscopy. Despite all these efforts, one often underappreciated fact remains: for many biological samples, diffraction-limited resolution is rarely achieved, even for high-end research microscopes. Ideal imaging performance of a light microscope requires the excitation and/or emission light to pass through samples with optical properties identical to those of the designed immersion media, and any deviation from such conditions causes optical distortions, known as aberrations, leading to the loss of signal, image fidelity, and resolution. In practice, biological samples have inhomogeneous optical properties, so that images are increasingly degraded with increasing depth within biological tissues.

Similar challenges exist for optical telescopes used in astronomy. Light captured from remote stars must first traverse the earth's turbulent atmosphere, which imparts optical distortions that severely degrade image quality. Methods that actively correct for such distortions, known collectively as adaptive optics ("AO"), have evolved to allow ground-based telescopes to obtain diffraction-limited images of extraterrestrial objects. Adaptive optics in astronomy is conceptually simple: a sensor placed near the imaging plane measures the distorted wavefront directly, and an active optical element, such as a deformable mirror, modifies this wavefront in a feedback loop to recover diffraction-limited performance. However, adaptive optics in microscopy is made less straightforward by the difficulty in measuring the aberrated wavefront directly—after all, it is rarely possible to place a wavefront sensor within the specimen. Backscattered light from the specimen has been used for such direct wavefront sensing, but such methods convolve the possibly differing aberrations both to and from the image plane, and are further complicated by multiply-scattered light.

SUMMARY

This disclosure describes microscopy techniques in which a rear pupil of an optical system is segmented and the segments are individually controlled with a wavefront modulating device to control the direction and phase of individual beamlets of an excitation or emission beam in the optical system, thereby providing an adaptive optics correction to sample and system induced aberrations.

In a general aspect, a method of forming an image of a sample includes focusing a beam of excitation light to a focal spot within the sample, where a cross-section of the beam including individual beamlets, and scanning the focal spot to different positions within the sample. Angles of the individual beamlets are individually controlling when the focal spot is at the different positions, and relative phases of the individual beamlets are individually controlled when the focal spot is at the different positions. Emission light emitted from the focal spot is detected when the focal spot is at the different positions, and an image of the sample is generated based on the detected emission light from the different positions of the focal spot.

Implementations can include one or more of the following features. For example, individually controlling angles of the individual beamlets can include modulating the excitation beam with a wavefront modulating element that includes individual subregions that correspond to the individual beamlets and, within each individual subregion, controlling profiles of phase values imparted by the subregion to the corresponding beamlet to induce a spatial gradient in the phase of the corresponding individual beamlet. The different positions can be located within a plane of the sample, and the plane can be perpendicular or non-perpendicular to an axis of the excitation beam in the sample. The excitation light can have a first wavelength and the emission light has a second wavelength that is less than the first wavelength (e.g., approximately one-half the first wavelength). The wavefront modulating element can include a spatial light modulator, and the method can further include applying a global phrase ramp to light reflected from an active layer of the spatial light modulator to induce a non-zero angle between light reflected from a front surface of the spatial light modulator and light reflected from the active layer.

The profiles of phase values can be determined. In one implementation, determining the phase values can include illuminating a reference object in the sample with different beamlets of the excitation beam, the different beamlets being modulated by different corresponding subregions of the wavefront modulating element. Emission light from the reference object can be detected when the reference object is illuminated by the different beamlets, and positions of the reference object in the sample can be determined based on the emission light detected when the reference object is illuminated by the different beamlets. Based on the determined positions, determinations can be made of beamlet-angle-correcting profiles of phase values to be imparted by each subregion to the subregion's corresponding beamlet to induce a spatial gradient in the phase of the corresponding beamlet, such that the positions would be substantially identical to each other when the beamlets include the spatial gradients in the phase. In another implementation, determining the phase values can include, in a plurality of beamlets, for each beamlet corresponding to a subregion of the wavefront modulation element: (a) illuminating a reference object in the sample with the beamlet; (b) detecting emission light from the reference object in the sample when the reference object is illuminated by the beamlet; (c) determining a position of the reference object in the sample based on the detected emission light. Then, based on the determined positions, determinations can be made of beamlet-angle-correcting profiles of phase values to be imparted by each subregion to the subregion's corresponding beamlet to induce a spatial gradient in the phase of the corresponding beamlet, such that when the beamlets include the spatial gradient in the phase the beamlets intersect at a focal spot in the sample having a smaller size than a focal spot formed when the beamlets do not include the spatial gradient in the phase. The reference object can be a fluorescent bead.

Determining the profiles of phase values can further include, based on the beamlet-angle-correcting profiles of phase values, determining relative phases between the beamlets at the wavefront modulation element that would result in constructive interference between the beamlets at the focal spot. Determining the profiles of phase values can further include, illuminating a reference object in the sample with a reference beamlet that is modulated by a reference subregion of the wavefront modulating element and successively permitting different beamlets modulated by different individual subregions of the wavefront modulating element to illuminate the reference object. For each beamlet, determinations can be made of profiles of phase values to be imparted to the beamlet by the beamlet's corresponding subregion to induce a relative phase between the beamlet and the reference beamlet that would result in constructive interference between the beamlet and the reference beamlet at the focal spot.

In another general aspect, a microscope system includes a light source configured to emit excitation light, focusing elements configured to focus a beam of the excitation light to a focal spot within a sample, a cross-section of excitation beam including individual beamlets, scanning elements configured to scan the focal spot to different positions within the sample, a wavefront modulating element configured to modulate the excitation light and to control angles and relative phases of the individual beamlets when the focal spot is at the different positions, a detector configured to detect emission light emitted from the focal spot when the focal spot is at the different positions, and a processor configured to generate an image of the sample based on the detected emission light from the different positions of the focal spot.

Implementations can include one or more of the following features. For example, the wavefront modulating element can be configured to control angles of the individual beamlets by, within individual subregions of the wavefront modulating element, which correspond to the individual beamlets, controlling profiles of phase values imparted by the subregion to the corresponding beamlet to induce a spatial gradient in the phase of the individual corresponding beamlet. The different positions are located within a plane of the sample, and the plane can be perpendicular or non-perpendicular to an axis of the excitation beam in the sample. The excitation light can have a first wavelength and the emission light has a second wavelength that is less than the first wavelength. The wavefront modulating element can include a spatial light modulator configured to apply a global phrase ramp to light reflected from an active layer of the spatial light modulator to induce a non-zero angle between light reflected from a front surface of the spatial light modulator and light reflected from the active layer.

The wavefront modulating element can be further configured to modulate directions of individual beamlets into directions that do not reach the sample, such that a reference object in the sample may be illuminated with remaining different individual beamlets of the excitation beam, the different beamlets being modulated by different corresponding subregions of the wavefront modulating element, and such that emission light from the reference object in the sample can be detected when the reference object is illuminated by the different beamlets. One or more processors can be included and configured to determine the profiles of the phase values by determining positions of the reference object in the sample based on the emission light detected when the reference object is illuminated by the different beamlets and, based on the determined positions, determining beamlet-angle-correcting profiles of phase values to be imparted by each subregion to the subregion's corresponding beamlet to induce a spatial gradient in the phase of the corresponding beamlet, such that the positions would be substantially identical to each other. A field stop located along a path of the excitation beam between the wavefront modulating element and the sample can be included and configured to block the beamlets of excitation light that are modulated into directions that do not reach the sample.

Determining the profiles of phase values can further include, based on the beamlet-angle-correcting profiles of phase values, determining relative phases between the beamlets at the wavefront modulation element that would result in constructive interference between the beamlets at the focal spot. The wavefront modulating element can be further configured to modulate directions of individual beamlets into directions that do not reach the sample, such that a reference object in the sample may be illuminated with remaining different individual beamlets of the excitation beam, the different beamlets being modulated by different corresponding subregions of the wavefront modulating element, and such that emission light from the reference object in the sample can be detected when the reference object is illuminated by the different beamlets. One or more processors can be included and configured to determine the profiles of the phase values by, for each different individual beamlet, determining profiles of phase values to be imparted to the beamlet by the beamlet's corresponding subregion to induce a relative phase between the beamlet and the reference beamlet that would result in constructive interference at the focal spot between the individual beamlet and the reference beamlet.

In another general aspect, a method of forming an image of a sample includes illuminating the sample with excitation light, collecting light emitted by the sample with an objective lens, modulating a beam of the collected light by a wavefront modulating element, where a cross-section of the beam of modulated light includes individual beamlets, individually controlling angles at which the individual beamlets are modulated by different individual subregions of the wavefront modulating element, and imaging the light modulated by the wavefront modulating element.

Implementations can include one or more of the following features. For example, individually controlling angles of the individual beamlets can include, within individual subregions of the wavefront modulating element, which correspond to the individual beamlets, controlling profiles of phase values imparted by the subregion to the corresponding beamlet to induce a spatial gradient in the phase of the individual corresponding beamlet. Profiles of phase values with which the beamlets are modulated by the individual subregions can be determined by: (a) imparting a pattern of Fresnel lenses on the wavefront modulating element, the different Fresnel lenses imparted on the different subregions of the wavefront modulating element; (b) illuminating a reference object in the sample with excitation light; (c) collecting light emitted by the reference object while the pattern of Fresnel lenses is imparted to the wavefront modulating element; (d) modulating a beam of the collected light with the wavefront modulating element while the pattern of Fresnel lenses is imparted, a cross-section of the beam of modulated collected light including individual beamlets; (e) imaging the collected modulated light; (f) comparing positions of features in a pattern of images of the reference object in the imaged light to positions features of an ideal pattern of images of the reference object; and (g) based on the comparison determining a profile of phase values that would reduce differences between the two patterns.

The wavefront modulating element can include a spatial light modulator, and global phrase ramp can be applied to light reflected from an active layer of the spatial light modulator to induce a non-zero angle between light reflected from a front surface of the spatial light modulator and light reflected from the active layer.

In another general aspect, microscope system can include a source of excitation light configured to illuminate a sample, and collection optics configured to collect light emitted by sample, a wavefront modulating element, and a detector. The wavefront modulating element can be configured to modulate a beam of the collected light, a cross-section of the beam of reflected light including individual beamlets, the wavefront modulating element being configured to individually control angles at which the individual beamlets are reflected from different individual subregions of the wavefront modulating element. The detector can be configured to image light reflected from the wavefront modulating element.

Implementations can include one or more of the following features. For example, individually controlling angles of the individual beamlets can include within individual subregions of the wavefront modulating element, which correspond to the individual beamlets, controlling profiles of phase values imparted by the subregion to the corresponding beamlet to induce a spatial gradient in the phase of the individual corresponding beamlet. The wavefront modulating element can include a spatial light modulator that is configured to apply a global phrase ramp to light reflected from an active layer of the spatial light modulator to induce a non-zero angle between light reflected from a front surface of the spatial light modulator and light reflected from the active layer.

One or more processors can be included and configured to determine the profiles of phase values imparted by the subregions, wherein the determining includes (a) imparting a pattern of Fresnel lenses on the wavefront modulating element, the different Fresnel lenses imparted on the different subregions of the wavefront modulating element; (b) illuminating a reference object in the sample with excitation light; (c) collecting light emitted by the reference object while the pattern of Fresnel lenses is imparted to the wavefront modulating element; (d) modulating a beam of the collected light with the wavefront modulating element while the pattern of Fresnel lenses is imparted, a cross-section of the beam of modulated collected light including individual beamlets; (e) imaging the collected modulated light; (f) comparing positions of features in a pattern of images of the reference object in the imaged light to positions features of an ideal pattern of images of the reference object; and (g) based on the comparison determining a profile of phase values that would reduce differences between the two patterns.

The details of one or more implementations are set forth in the accompanying drawings and the description below. Other features will be apparent from the description and drawings, and from the claims.

BRIEF DESCRIPTION OF THE DRAWINGS

FIG. 9A is schematic diagram of a Fresnel zone plate pattern applied to a wavefront modulating element.

FIG. 9B is schematic diagram an image of an object formed by imaging of the object with the Fresnel zone plate pattern of FIG. 9A.

FIG. 9C is schematic diagram of an array of Fresnel zone plate patterns applied to a wavefront modulating element.

FIG. 9D is schematic diagram an array of images of an object formed by imaging of the object with the array of Fresnel zone plate patterns of FIG. 9C.

DETAILED DESCRIPTION

Figure 1:
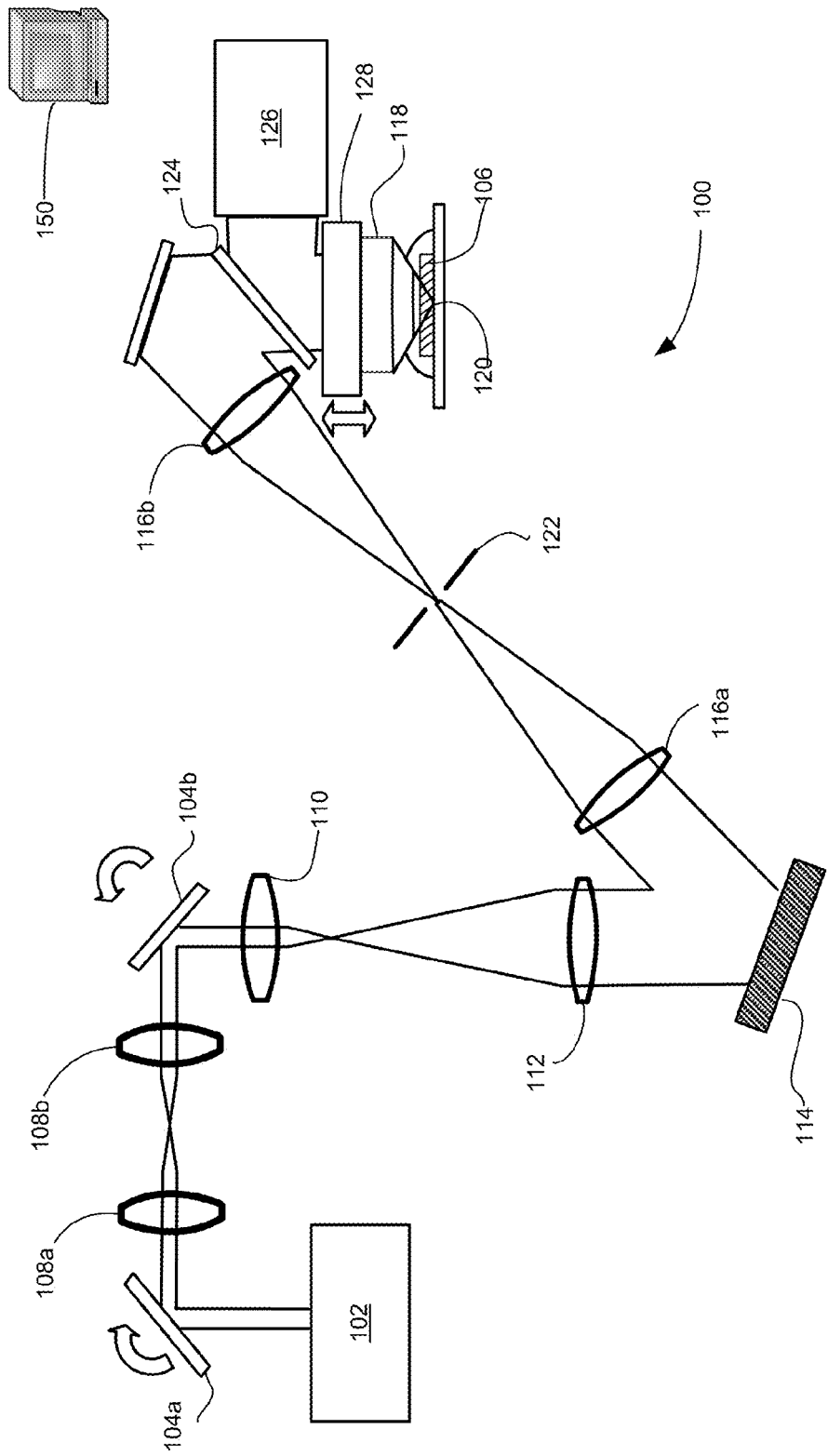
FIG. 1 is a schematic block diagram of a microscopy system that can be used for point-scanning microscopy in which adaptive optics are used to correct for system and/or sample aberrations.

FIG. 1 is a schematic block diagram of a microscopy system 100 that can be used for point-scanning microscopy of a sample in which adaptive optics are used to correct for system and/or sample aberrations. In point-scanning microscopy light is focused into a diffraction-limited spot, and signal light originating from the spot is with a non-imaging detector (e.g., a photo-multiplier tube). An image of an object is formed by scanning the focal spot across the sample, and computationally constructing an imaged from the signal light obtained from the different positions of the spot. The system includes a source 102 of excitation light. In an example embodiment, the source 102 can include a femtosecond pulsed Titanium:Sapphire laser (e.g., a model Chameleon Ultra II, available from Coherent Inc.) that produces a near-infrared beam of excitation light. The beam of excitation light can be reflected from a pair of galvanometers 104a, 104b to provide for two-dimensional (2D) raster scanning (in the x-direction and in the y-direction) of the excitation light beam and of the focal spot of the excitation beam in the sample 106. In one implementation, the galvanometers can include three mm beam aperture galvanometers, model number 6215H, available from Cambridge Technology Inc. The galvanometers 104a, 104b can be made optically conjugate to one another with two custom-made 30 mm focal-length telecentric f-θ lenses 108a, 108b. A third lens 110 and a custom-made 150 mm focal-length telecentric f-θ lens 112 serve to conjugate the galvanometer 104b to a wavefront modulating element ("WME") 114, and also expand the excitation beam to better match the dimensions of the WME.

In one implementation, WME 114 can include liquid-crystal phase-only spatial light modulator (e.g., a 1920×1080 pixel, PLUTO-NIR spatial light modulator available from Holoeye Photonics AG). In other implementations, the WME 114 can include a deformable mirror (e.g., Mirao 52-e, available from Imagine Eyes, Inc) or an array of micromirrors (e.g., Kilo-DM from Boston Micrmachines). The WME 114 can be programmed to provide for specific AO corrections of system- or sample-induced aberrations. An advantage of using a reflective liquid-crystal phase-only spatial light modulator (SLM) as the WME is that, with a high number of pixels (e.g., 1920×1080 pixels), it can be readily divided into many subregions, each with a smoothly varying linear phase ramp therein, and in part because the subregions are truly independent, and not mechanically coupled, as in a deformable mirror. Conjugation of the galvanometers 104a and 104b to the WME 114 insures that the intensity of the excitation beam at each subregion of the WME 114 remains constant, even during beam scanning.

The WME 114 is itself can be conjugated by a pair of lenses 116a, 116b to a microscope objective lens 118 that focuses the excitation beam to a focal spot 120 within the sample 106. In one implementation, the objective 118 can be a 20× NA 1.0 water-dipping objective with a 16 mm diameter rear pupil (e.g., model W Plan-APOCHROMAT, available from Carl Zeiss Inc.). In another implementation, the objective 118 can be a 16× NA 0.8 water-dipping objective with a 20 mm diameter rear pupil (e.g., a model LWD 16×W, available from Nikon Corp.).

Conjugation of the WME 114 to the objective 118 ensures that the corrective phase pattern applied at the WME 114 does not oscillate across the rear pupil during scanning of the excitation beam and scanning of the focal spot 120 within the sample 106. A field stop 122 located at the intermediate image plane between the lenses 116a, 116b serves to block light from undesirable higher diffraction orders, specular reflection from the front surface of the WME (when the WME includes a reflective element, such as a SLM), and light that is reflected from subregions of the WME 114 at angles that are intended to prevent light from the subregions from entering the sample 106.

For the Zeiss objective (design NA 1.0), a $1/e^2$ beam radius of 6.0 mm at the WME 114 and the rear pupil of the objective 118 for a fill-factor $\sigma/\alpha=0.75$ normalized to the rear pupil radius α can be used. For the Nikon objective (design NA 0.8), the $1/e^2$ beam radius σ can be 6.0 mm at the WME 114, and a $1/e^2$ beam radius can be 12.0 mm at the rear pupil of the objective 118, for a normalized fill-factor $\sigma/\alpha=1.2$. These fill-factors can ensure that phase corrections can be applied over most of the excitation beam and that most of the excitation beam energy enters the objective 118. The lower fill-factor of the Zeiss objective makes the objective better suited for in vivo imaging at depth, whereas the higher fill in the Nikon case more effectively utilizes the objective NA to maximize resolution. For the Zeiss objective, the WME area used in adaptive optics correction is rectangular, while for Nikon objective, the WME area is square.

A dichroic long-pass beamsplitter 124 immediately above the objective can transmit the excitation beam light to the sample 106 and can reflect the fluorescence signal of emission light emitted from the sample 106. The reflected emission light then can be detected at a detector 126. The detector 126 can be one or more photomultiplier tubes (e.g., Model H7422-40, available from Hamamatsu). The objective 118 can be moved in the axial direction of excitation beam that impinges on the sample 106 by a z-axis stage 128. The system 100 can include one or more processors and/or computing devices 150, which may operate to control other elements of the system and or to process information obtained from the system. For example, the processors and/or computing devices 150 can operate to control the power and frequency of the light source 102 to control the position and/or angles of optical elements in the system, including mirrors and lenses, to control optical properties of the WME 114. The processors and/or computing devices 150 also can operate to process information about light detected by the detector 126. For example, the processors and/or computing devices 150 may generate an image of the sample 106 based on the detected light—e.g., when the system is used for point-scanning microscopy, the processors and/or computing devices 150 may generate an image of the sample 106 based information about the amount and qualities of emission light when the focal spot 120 is in different positions in the sample 106.

Figure 2:
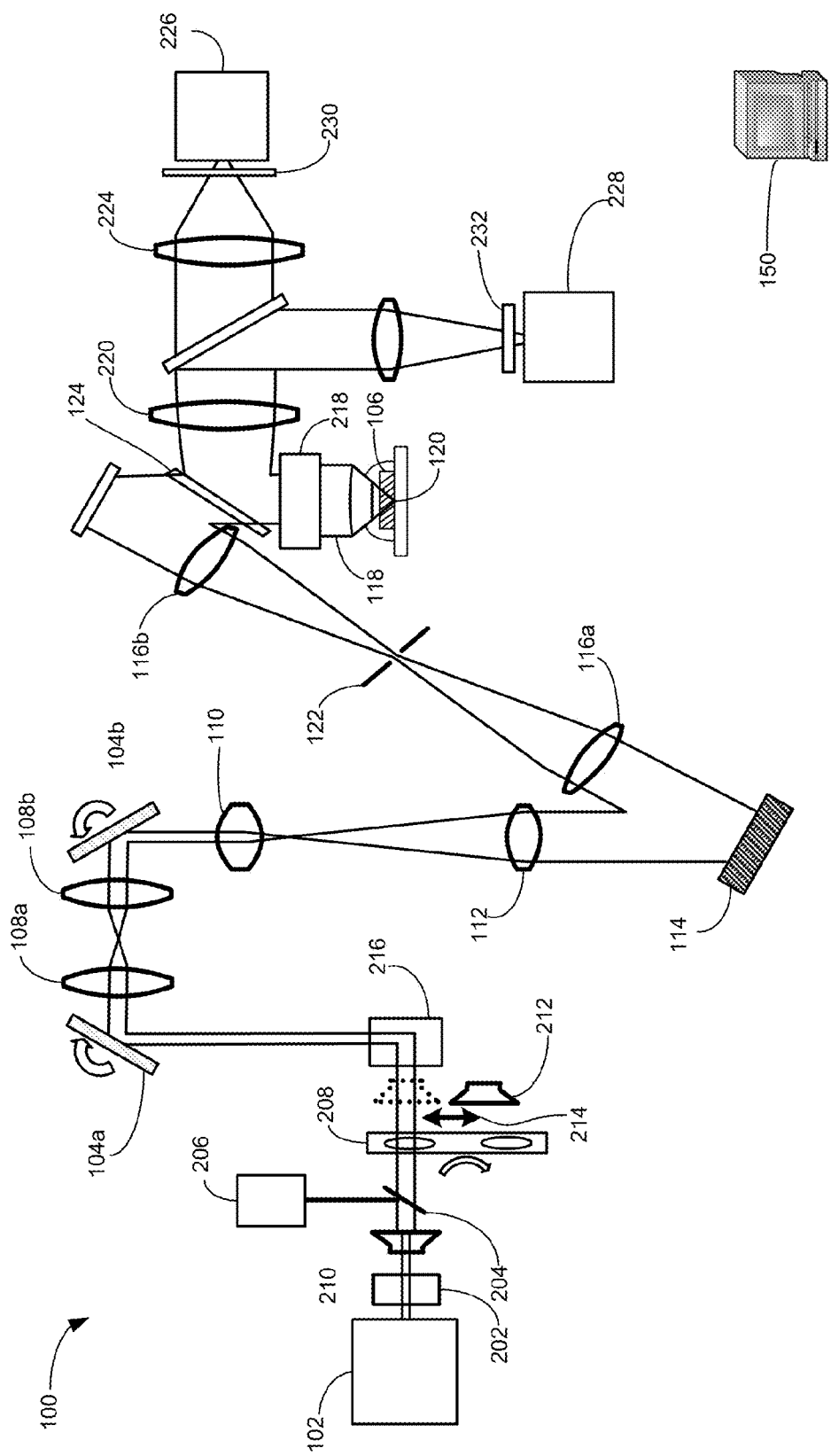
FIG. 2 is a schematic block diagram of a microscopy system that can be used for point-scanning microscopy in which adaptive optics are used to correct for system and/or sample aberrations.

FIG. 2 is a schematic block diagram of the microscopy system 100, which shows additional details of the system 100 shown in FIG. 1. Some additional details of the system include and an electro-optic modulator ("EOM") 202, (e.g., a model 350-80LA EOM, available from Conoptics Inc.) that can be combined with a beam pickoff 204 (e.g., a model 7940 beam pickoff, available from Omega Optical), a photodetector 206 (e.g., a model PDA100A photodetector, available from ThorLabs), and a proportional-integral-differential controller (not shown, e.g., a SIM960 controller, available from Stanford Research Systems,) in an analog feedback loop to: 1) set the desired laser intensity at the sample; 2) stabilize the laser intensity; and c) blank the excitation beam, when the beam is not being used for scanning of the sample 106, or during fly-back of the x-galvanometer 104a while scanning A filter wheel 208 (e.g., Lambda 10-B filter wheel, available from Sutter Instruments) with a series of neutral density filters can be used to further extend the dynamic range over which the power of the excitation beam can be reliably controlled (e.g., from 0.01% to 100% of the full power of the excitation beam). A 2× beam expander 210 (e.g, a model BE02M-B, available from Thorlabs Inc.) can be used to minimize divergence of the excitation beam over the long path from the EOM 202 to the microscope objective 118. Conversely, a 2× beam reducer 212 (e.g., a model BE02M-B, available from Thorlabs Inc.) mounted on a fast translation stage 214 (e.g., a model M-663, available from Physik Instrumente, GmbH) can be shuttled into the path of the excitation beam to concentrate the beam onto a subsection of the WME 114 when needed. A pair of mirrors 216 mounted on an identical pair of fast translation stages can position the beam in two dimensions relative to the WME 114. The operation of the beam reducer 212 and the laser positioning mirrors 216 is explained in more detail below.

The microscope objective can be mounted to a fast single axis piezo flexure stage 218 (e.g., a model P-733.ZCL stage, available from Physik Instrumente, GmbH) for 2D and 3D imaging in the axial direction. Along the detection path, fluorescence can be first collimated by a lens 220 (e.g., a LA1002-A lens, available from Thorlabs), split into red and green components by a custom dichroic beamsplitter 222 (e.g., a Q560DCXR beamsplitter, available from Chroma Technology Corp.), refocused by two additional lenses 224, 226 (e.g., model LA1002-A lenses, available from Thorlabs), and then detected at the two PMTs 226, 228. Green fluorescence is selected at the first PMT 226 with a pair of filters 230 (e.g., glass filter: model CG-BG-39-1.00-2, available from CVI, and bandpass filter: model FF01-510/84, available from Semrock), and red fluorescence can be selected at the second PMT 228 with a different filter pair 232 (e.g, bandpass filter: model FF01-617/73, available from Semrock, and bandpass filter: model FF01-630/69, available from Semrock). Low noise current amplifiers (e.g, model DLPCA-200 amplifiers, available from FEMTO Messtechnik, GmbH) can be used to boost the signals measured at the two PMTs 226, 228, and fast-resetting custom analog integrators can be used to sum the resulting amplified current spikes over the time course of each pixel, yielding two final signals that are digitized to form red and green images.

The system 100 of FIG. 1 and FIG. 2 can be used, for example, for two-photon fluorescence microscopy in thick tissues, in which a beam of excitation light is tightly-focused to focal spot within the sample 106, and emission light is detected from the focal spot 120 while the focal spot is scanned through the sample 106. In two-photon microscopy, the only aberrations that affect image quality are those experienced by the focused excitation light because they degrade the tight focus of the focal spot 120. Although the spatial intensity profile of the focal spot 120 can be calculated from electromagnetic theory, and deviations from its ideal, diffraction-limited form can be described mathematically in terms of an infinite series of aberration modes, here we instead rely on a simple physical model of focus formation that leads to an intuitive adaptive optics algorithm for aberration correction.

Figure 3:
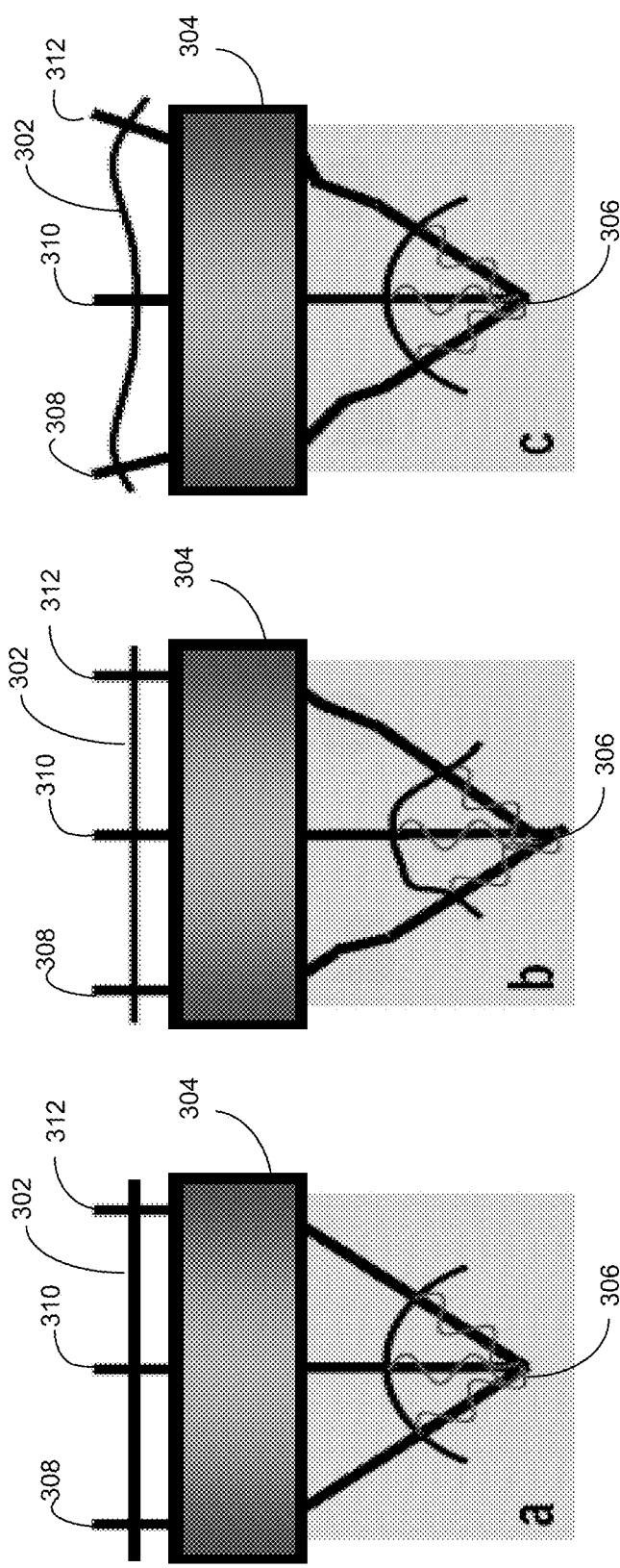
FIG. 3a is schematic diagram of a plane wave light beam impinging on an objective and being focused to a diffraction-limited focal spot without aberration.
FIG. 3b is schematic diagram of a plane wave light beam impinging on an objective and being focused to a non-diffraction-limited focal spot while suffering aberration due to inhomogeneities along the path of the wave.
FIG. 3c is schematic diagram of a distored wave light beam composed of multiple beamlets impinging on an objective and being focused to a diffraction-limited focal spot while suffering aberration due to inhomogeneities along the path of the wave, where the aberration suffered is compensated for by the angles and the relative phases with which the beamlets enter the rear pupil of the objective.

In this model, a diffraction-limited focus 120 is viewed to arise when all light rays entering the rear pupil of the microscope objective 118 are bent to intersect at a common point with a common phase—that is, a focus is a point of maximal constructive interference. Such a condition is illustrated in FIG. 3a, where a beam that impinges on a microscope objective 304 as a plane wave 302 is focused by the microscope objective 304 to a point 306 and each example beamlet 308, 310, 312 of the beam is focused to the same focal point 306. However, as shown in FIG. 3b, unanticipated refractive index inhomogeneities along the paths between the objective 304 and the nominal focal point 306 can deflect the beamlets 308, 310, 312, so they do not all intersect at the focal point and/or can shift the relative phases of the beamlets 308, 310, 312, so that individual beamlets interfere with other beamlets at the focal point less constructively.

As shown in FIG. 3c, using an active optical element, such as the wavefront modulating element 114, optically conjugated to the rear pupil of the microscope objective, such beamlets can be individually steered back to the focal point 306, and their relative phases can be re-optimized to effectively cancel all sample induced aberrations, so that a diffraction-limited focus 306 can be obtained. When such an active optical element is used to correct for aberrations, the beam that impinges on the rear pupil of the microscope objective is not a plane wave but rather is a distorted wave 314 that includes beamlets 316, 318, 320 that impinges on the rear pupil at positions on the rear pupil, at angles to the normal of the rear pupil, and with relative phases to each other, such that they pass through the objective 304 and the sample and are tightly focused, in phase, at a focal spot having a very low spatial extent. Of course, it is not possible to individually manipulate an infinite continuum of beamlets, but it is possible to divide the active element 114 into N subregions, with each subregion having an independently adjustable planar phase pattern, and thereby segment the rear pupil into N beamlets individually controllable for tilt angle and relative phase offset. As the complexity of the required corrective phase pattern across the rear pupil increases, more subregions N are needed to achieve an accurate approximation. However, for a wide variety of aberrations, N<100 is usually sufficient to recover near diffraction-limited performance.

Figure 4A:
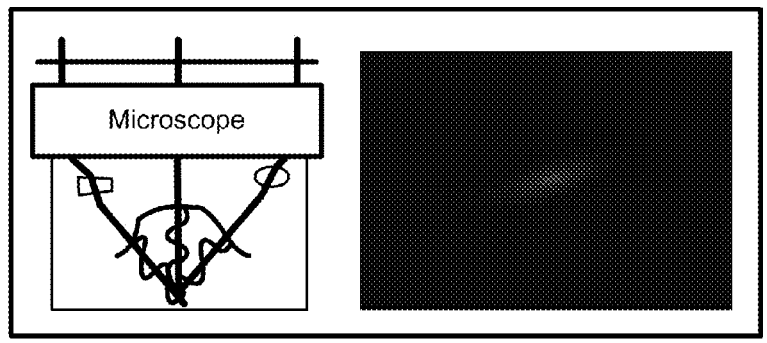
FIG. 4A is schematic diagram of a plane wave excitation light beam impinging on an objective and being focused to a non-diffraction-limited focal spot within a sample while suffering aberration due to inhomogeneities along the path of the beam and a corresponding image of an object in the sample created from emission light from the object.

To bring the beamlets modulated by individual subregions of the WME 114 together at a common focal spot 120, first a reference image of the sample 106 can be acquired while the rear pupil of the objective 118 is fully illuminated. For example, as shown in FIG. 4A, an image can be created using a beam of the aberrated excitation light. For example, a fluorescent bead within the sample 106 can be used to create the reference image. The lateral image plane chosen for adaptive optics correction can be selected by acquiring a three-dimensional stack of images of a feature of interest in the sample 106, such as a fluorescent reference bead, and selecting the plane where the signal is maximal, as integrated over a user defined region of interest. Presumably, this plane is closest to the original ideal focus, and hence will require the least correction to recover diffraction limited performance.

After a reference image has been acquired, a binary phase pattern can be applied to all but one of the N subregions of the WME 114—a pattern that causes the beamlets associated with the all but one of the N subregions to be diffracted to and blocked by a field stop 122 at an intermediate image plane, rendering those beamlets effectively "off" (meaning that the light that is impingent on those subregions does not reach the objective 118). A beamlet can be turned "off" by applying a phase grating consisting of alternate rows of 0 and π phase shift to the subregion of the WME 114 associated with the beamlet. This phase grating diffracts most of the light in beamlets modulated by these subregions into the field stop 122 at an intermediate image plane, where the light is blocked.

Figure 4B:
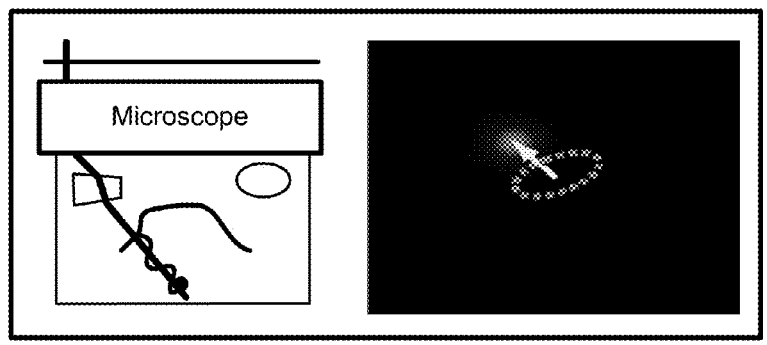
FIGS. 4B, 4C, and 4D are schematic diagrams of beamlets of the excitation light beam of FIG. 4A impinging on an objective and being diffracted to a focal spot within the sample and a corresponding images of the object created from emission light from the object.
Figure 4C:
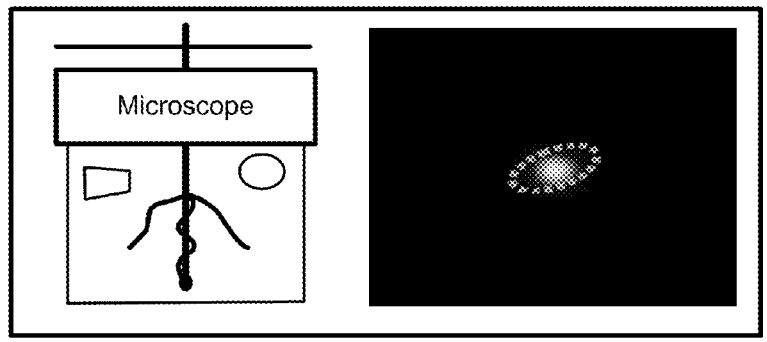
Figure 4D:
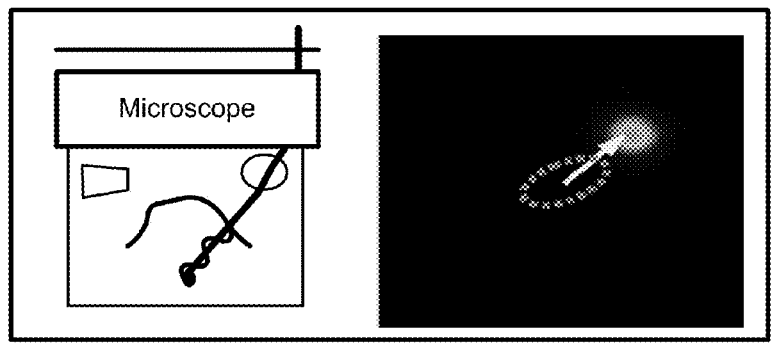

Then, an image of the sample (e.g., an image of a fluorescent bead in the sample) can be acquired using the sole remaining "on" beamlet. Any inhomogeneities along the path of the sole remaining "on" beamlet that deflect the beamlet from the ideal focal point are evidenced as a shift in this image relative to the reference image. For example, as shown in FIG. 4B, an image of a fluorescent bead in the sample produced due to excitation light from only the beamlet shown in FIG. 4B is displaced up and to the left from the image (see dashed line) produced from all beamlets of the aberrated excitation light, as shown in FIG. 4A. For example, as shown in FIG. 4C, an image of a fluorescent bead in the sample produced due to excitation light from only the beamlet shown in FIG. 4C is located in the center of the image (see dashed line) produced from all beamlets of the aberrated excitation light, as shown in FIG. 4A. For example, as shown in FIG. 4D, an image of a fluorescent bead in the sample produced due to excitation light from only the beamlet shown in FIG. 4D is displaced up and to the right from the image (see dashed line) produced from all beamlets of the aberrated excitation light, as shown in FIG. 4A.

For simple isolated objects, the shift of an image produced by excitation light from just one beamlet can be determined from the shift in the centroid of an object in the image, whereas for more complex samples, image correlation can be used to determine the shift. In more complex samples, image correlation of multiple features in the sample due to measure the image shift when different pupil segments are turned on. For example, images of a plurality of fluorescent beads or other features in a sample can be compared and used to steer beamlets to a common focus. Image correlation also permits application of the adaptive optics techniques within complex biological tissues having arbitrary fluorescence patterns.

One advantage of using image correlation for the beam deflection measurements is that it measures the mean aberration over the entire user-selected correlation region, and hence provides adaptive optics correction valid over the entirety of that region. The corresponding disadvantage is that, because the measured aberration represents an average of the optical properties over a larger volume of biological tissue, it can lead to less than optimal correction in specific subregions where the local refractive index profile differs from the measured average. In such regions, more local measurements may be called for, using either local image correlation or centroid estimation of local features. The larger field of view image could then be stitched together from smaller sub-images, each produced with a unique corrective wavefront.

In any event, once the shift in tilt angle of individual beamlets from the their non-aberrated directions is known, the deflection angle of the beamlet from the desired direction of the beamlet can be calculated, and an equal but opposite angle can be imparted to the beamlet by application of an appropriate phase ramp at the corresponding subregion of the WME 114.

Figure 4E:
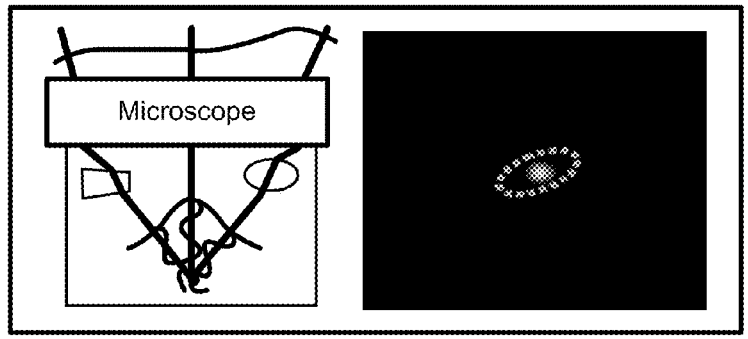
FIG. 4E is schematic diagram of a distored wave light excitation beam composed of multiple beamlets impinging on an objective and being focused to a diffraction-limited focal spot while suffering aberration due to inhomogeneities along the paths of the beamlets, where the aberration suffered is compensated for by the angles with which the beamlets enter the rear pupil of the objective.

This process then can be repeated for the other N−1 subregions of WME 114 and for the other N−1 corresponding beamlets, until all N beamlets intersect at a common focal point, as shown in FIG. 4E. For tilt angle measurements with N subregions, the power can be increased initially at least N-fold, to compensate for the fact that only one subregion is "on" at a time. Due to the Gaussian intensity variation across the WME 114, further power adjustments can be made automatically at each subregion as needed to yield enough signal to measure the image displacement accurately, but not so much as to cause excessive photobleaching in the sample 106.

Figure 4F:
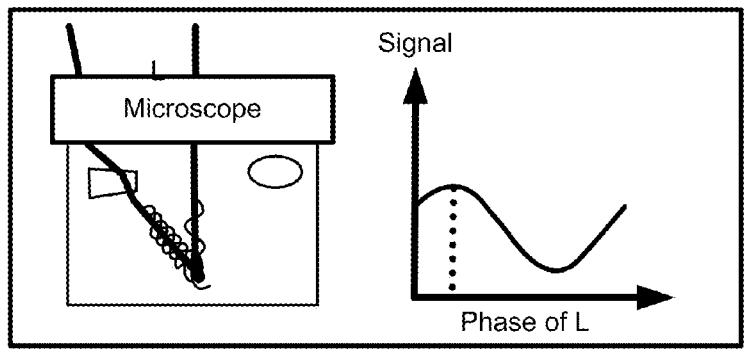
FIGS. 4F and 4G are schematic diagrams of respective beamlets of the excitation light beam of FIG. 4E, along with a reference beamlet of the light beam, both the respective beamlets and the reference beamlet impinging on an objective and being diffracted to a focal spot within the sample, where different relative phases between the respective beamlet and the reference beamlet are shown, and signal of emission light emitted from the sample, as a function of the relative phase.
Figure 4G:
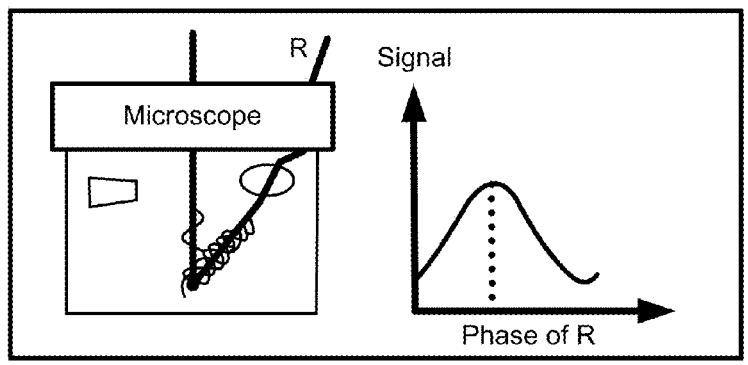
Figure 4H:
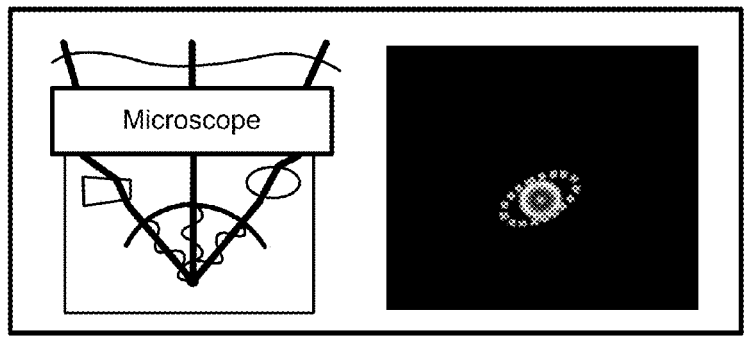
FIG. 4H is schematic diagram of a distored wave light excitation beam composed of multiple beamlets impinging on an objective, where the relative phases and angles at the beamlets impinge on a rear pupil of the objective are controlled, such that the individual beamlets are focused, in-phase, to a diffraction-limited focal spot within the sample.

Next, to correct the phases of the beamlets, a reference beamlet can be turned "on," along with one of the other N−1 beamlets. A series of images then can be acquired with different phases imparted to the second beamlet until the signal at the focal point is maximized, as shown in FIG. 4F. This process then can be repeated, using the same reference beamlet and, in turn, each of the remaining N−2 beamlets, as shown in FIG. 4G. The adaptive optics algorithm is then complete and, if N is sufficiently large, the beamlets of the excitation beam all interest at a common focal spot, and are in phase with each other at the focal spot, such that a diffraction limited focus is achieved. When correcting the relative phases of the different individual beamlets, the power of the particular beamlets of exitation light can be adjusted as needed to achieve sufficient signal but to avoid photobleaching. To further minimize photobleaching, only 4-7 images may be acquired at equally spaced phase offsets between 0 and $2\pi$ for each subregion. Then, the exact phase offset $\phi_0$ for maximum constructive interference can be determined by fitting the signal at the focus from each of these images to the function $S=|1+\alpha \exp(i(\phi-\phi_0))|^4$, where S represents the two photon signal arising from the interference of the electric field from the current subregion with that from either the reference subregion, or all other subregions.

In another implementation, to correct the phase of the individual beamlets, information about the beam deflection angles applied by the WME 114 to bring the individual beamlets together to intersect in a common focal spot can be used to define an array of phase gradient measurements across the rear pupil of the objective. From these phase gradient measurements, the relative phases of the individual beamlets at the rear pupil necessary for the individual beamlets to interfere constructively at the focal spot 120 can be determined through an interative algorithm based on the known spatial continuity of the phase across the wavefront, as described in Panagopoulou, S. I., Neal, D. R., "Zonal matrix iterative method for wavefront reconstruction from gradient measurements," *J. Refract. Surg.* 21, S563-S569 (2005), which is incorporated herein by reference.

In the "on" subregions, when the WME includes a reflective element, such as a SLM, a gentler, global phase ramp can be applied to separate the large fraction of light modulated within the WME 114 from the small fraction of light specularly reflected from the front surface of the WME, which cannot be controlled. After adaptive optics correction, another, local phase ramp, that is unique to each subregion of the WME 114 can be is superimposed upon the global phase ramp to produce the necessary correction to the tilt angle and phase of the individual beamlets required to create a diffraction-limited focal spot 120 in the sample 106. In one implementation, individual pixels of the WME can be programmed with one of 256 different grayscale values. The relationship between the 8 bit grayscale level used to control the WME and the actual phase shift produced in a beamlet modulated by a pixel is determined by calibration according to the manufacturer's recommendations.

For both the tilt angle and phase measurement portions of the adaptive optics process, a background image with all subregions "off" can be acquired whenever the power level is changed, and the background image can be subtracted from all subsequent images acquired at the same power level, to insure the accuracy of the measurements.

The adaptive optics process approach should operate over a wide dynamic range of power, since a single "on" subregion will deliver at most 1/N of the power available in the excitation beam to the sample 106 in a beamlet having a spatial extent of ~1/√N of the full NA of the objective 118. This can result is a large focus of significantly reduced intensity I and, for two-photon excitation, an even more drastic reduction in peak signal S, because the signal is proportional to $|I|^2$. Remediation measures can include increasing the laser power and pixel integration time when a single beamlet of excitation light is used, and concentrating the excitation light at the "on" subregion using a 2× beam reducer 212 and a pair of beam steering mirrors 216.

Nevertheless, the amount of power available in the excitation beam still sets a practical limit on the number of beam deflection measurements, and hence the complexity of the correction that can be provided, when the rear pupil is divided into N non-overlapping subregions, only one of which is turned on at a time (hereafter termed the "independent mask approach"). An alternative formulation (hereinafter termed the "overlapping mask approach") leading to higher N involves turning on contiguous groups of subregions in a series of overlapping masks, with each mask corresponding to a fraction 1/M of the rear pupil area larger than the rear pupil area that corresponds to any single subregion of the WME 114, thereby producing a significantly more intense focus. The beam deflection and phase offset is measured for each mask as described above, and different masks are applied until each subregion is sampled by a unique set of masks, leading to a unique corrective phase in each subregion.

Figure 5:
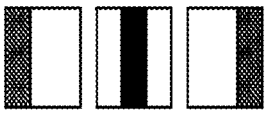
FIG. 5a is a schematic diagram of a three independent masks that are used to segment a rear pupil of an objective.
FIG. 5b is a schematic diagram of a nine independent masks that are used to segment a rear pupil of an objective.
FIG. 5c is a schematic diagram of a six masks that overlap to create nine segments at a rear pupil of an objective.
FIG. 5d is a schematic diagram of a nine masks that are positioned in multiple positions to overlap with each other to create 18 segments at a rear pupil of an objective.

FIGS. 5a, 5b, 5c, and 5d, FIG. 5a provide examples of the independent, overlapping, and stepped overlapping mask approaches to adaptive optics correction. The rear pupil of the objective 118 is represented by the large squares in the figure, and the shaded rectangles represent the fraction of the pupil turned on at specific points during beam deflection measurement. In the independent mask approach, shown in FIGS. 5a and 5b, the rear pupil of the objective 118 is segmented into non-overlapping areas. Each area, or "mask," is turned "on" individually during the beam deflection measurements. The corrective wavefront in each masked subregion is estimated by a plane independent from that in all other regions. FIG. 5a illustrates the independent mask approach, in which three non-overlapping masks for the WME 114, each corresponding to ⅓ of the total pupil area, independently measure beam deflection and correct for aberration in each of three pupil subregions. FIG. 5b illustrates the independent mask approach, in which nine non-overlapping masks for the WME 114, each corresponding to ⅑ of the pupil area, independently measure beam deflection and correct for aberrations in each of nine pupil subregions.

In the overlapping mask approach, shown in FIG. 5c, masks that are individually "on" during beam deflection measurement overlap with other masks. As a result, the total number of planar subregions in the final corrective wavefront is larger than the ratio of the pupil area to the mask area. However, the final values of phase in these subregions may not be fully independent from one another, due to mask overlap. On the other hand, for a given mask area, or equivalently, a given laser power, overlapping masks allows many more subregions to be used, and thus often leads to superior correction. Thus, FIG. 5c illustrates the overlapping mask approach, in which six overlapping masks for the WME 114, each covering ⅓ of the pupil area, lead to unique wavefront estimations for each of nine different pupil subregions.

Finally, in the stepped overlapping mask approach, shown in FIG. 5d, masks have the same dimensions, but are displaced from their neighbors by a distance less than the dimension of the mask. For example, the pattern described in FIG. 5d is denoted 3×3 with 2×1 stepped overlapping masks, where "3×3" denotes the dimension of each mask (three horizontal×three vertical masks to span the rear pupil), and "2×1" denotes the stepping pattern (two steps to cross the width of each mask, and one step to cover the height). This approach particularly well suited to phase reconstruction, since it permits a dense array of phase gradient data to be measured on a regular interval. Thus, in the stepped overlapping approach, an aberrated wavefront can be measured on a scale smaller than the size of a single "on" subregion by moving the subregion in a series of discrete steps smaller than subregion itself and measuring the beam deflection, and thus the phase gradient, at each step. FIG. 5d illustrates the stepped overlapping mask approach, in which a mask for the WME 114 covering ⅑ of the pupil area is translated in horizontal steps equal to half the width of the mask, and in vertical steps equals to the height of the mask. Beam deflection is measured at each position of the mask. Thus, FIG. 5d is denoted as 3×3 with 2×1 stepped overlapping masks, such that the mask corresponding to ⅑ of the pupil area, leads to unique wavefront estimations for each of 18 different pupil subregions. Phase reconstruction can be used to determine the optimal phase offset at each position of the stepped overlapping mask, and combined with the gradient data to determine the plane of best fit to the aberrated wavefront in the region centered at each measurement point.

The overlapping and stepped overlapping mask approaches can be extended further, such that, for example, N=81 subregions of the rear pupil can be defined using masks that correspond to ⅑ the area of the rear pupil. Of course, for a given number of subregions, N, the independent mask approach outperforms the overlapping or stepped overlapping mask approaches, due to residual coupling between the subregions. However, for a given mask area, or equivalently, a given laser power, overlapping or stepped overlapping masks allows many more subregions to be used, and thus often leads to superior correction.

The reduction in the aberration of excitation beam light at the focal spot 120 of the sample 106 and the improvement in the resulting images obtained from the sample generally increases monotonically as a function of the number of subregions, N, of the WME 114, which correspond to individual segments of the rear pupil of the objective 118, although at some value of N the improvement in resolution and signal strength reaches saturation. The number of subregions N required to achieve good results will depend on the specifics of the sample under investigation, the parameter being optimized, and the degree of optimization desired. Of course, the density of subregions on the WME 114, which correspond to individual segments of the rear pupil of the objective 118, does not have to be uniform across the WME. Rather, an initial low resolution map of the aberrated wavefront can be made using a low value N, and then the areas suggestive of fine structure can be sampled with a higher density of subregions.

Aberrations affecting the performance of the microscope system 100 can come from anywhere along the optical path between the source 102 and the focus 120, as well as from the sample 106 itself. Thus, these intrinsic microscope aberrations can be characterized in order to be able to derive the sample-induced component of the total measured aberration in subsequent experiments. For example, an image may be acquired of a fluorescent bead reference object, and the image may show significant astigmatism and coma that may be largely attributable to poor flatness of the WME 114. However, after applying the adaptive optics correction described herein with N=36 independent subregions and direct phase measurement, the full width at half maxima (FWHM) of the bead images in both the lateral (X-Y plane) and axial (X-Z, Y-Z, long axis-Z, and short axis-Z planes) directions can approach their diffraction-limited values.

After the adaptive optics process is complete and the phases to be applied to the WME subregions, which result in individual beamlets having the proper angles and phases at the rear pupil of the objective 118 to achieve a diffraction-limited focal spot 120, have been determined, the phase pattern on the WME 114 represents the final corrective wavefront, modulo $2\pi$. To display this wavefront in a more intuitive form, the global phase ramp used during measurement is subtracted, and the phase is unwrapped by counting fringes and assuming that the phase is continuous across subregion boundaries. Finally, to determine the aberration due to the sample alone, the portion of the unwrapped wavefront due to system aberrations is subtracted.

In addition to being used for point-scanning microscopy, as described above, adaptive optics also can be used to enhance the quality of images obtained through widefield microscopy. In widefield microscopy, a large region of the sample is uniformly illuminated and the entire region of interest is recorded simultaneously on an imaging detector (e.g., a CCD camera). For most point-scanning methods, the major effect of aberration is on the excitation light, preventing the formation of a diffraction-limited focus. The major effect of aberration, as described above, is then on the emission path, preventing the signal emitted from each point in the sample from being refocused to a diffraction-limited spot at the imaging detector. Point-scanning microscopy is preferred in scattering biological tissues, and widefield-scanning microscopy is more commonly applied to transparent biological samples, but sample-induced aberration is common in either case.

Figure 6:
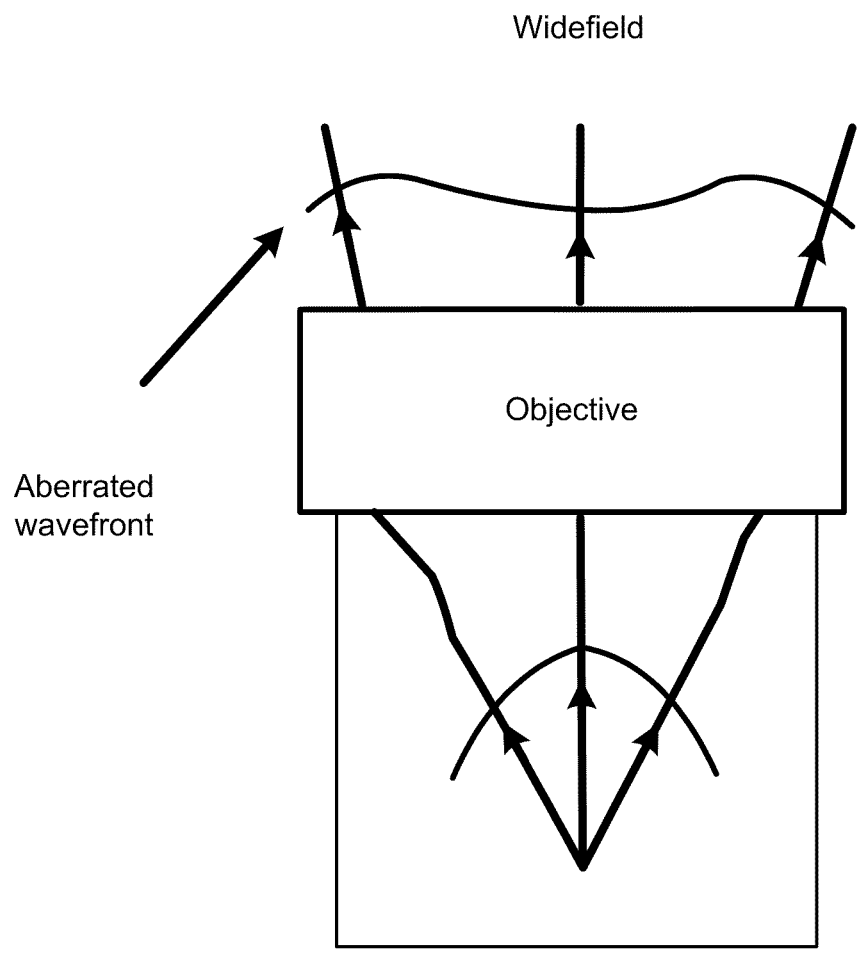
FIG. 6 is a schematic diagram of a sample that induces aberrations to light that passes through the sample.

For example, as shown in FIG. 6, a spherical wave front of emission light can be emitted from a point 602 in a sample 604. The wave front can be distorted (i.e., aberrated) by index of refraction inhomogeneities in the sample 604. Then, focusing the aberrated wavefront by a microscope objective 606 does not result in a plane wave but in an aberrated wave front 608.

Unlike point scanning microscopy, conventional widefield microscopy lacks optical sectioning ability. Thus, it is usually used for single cultured cells and ultrathin tissue sections, where aberration is typically not an issue. However, with the recent development of widefield methods having axial sectioning capability, such as selective plane illumination microscopy ("SPIM") and structured illumination microscopy ("SIM"), application to thick samples is now possible, so correcting the aberration of the emitted light becomes relevant.

Figure 7:
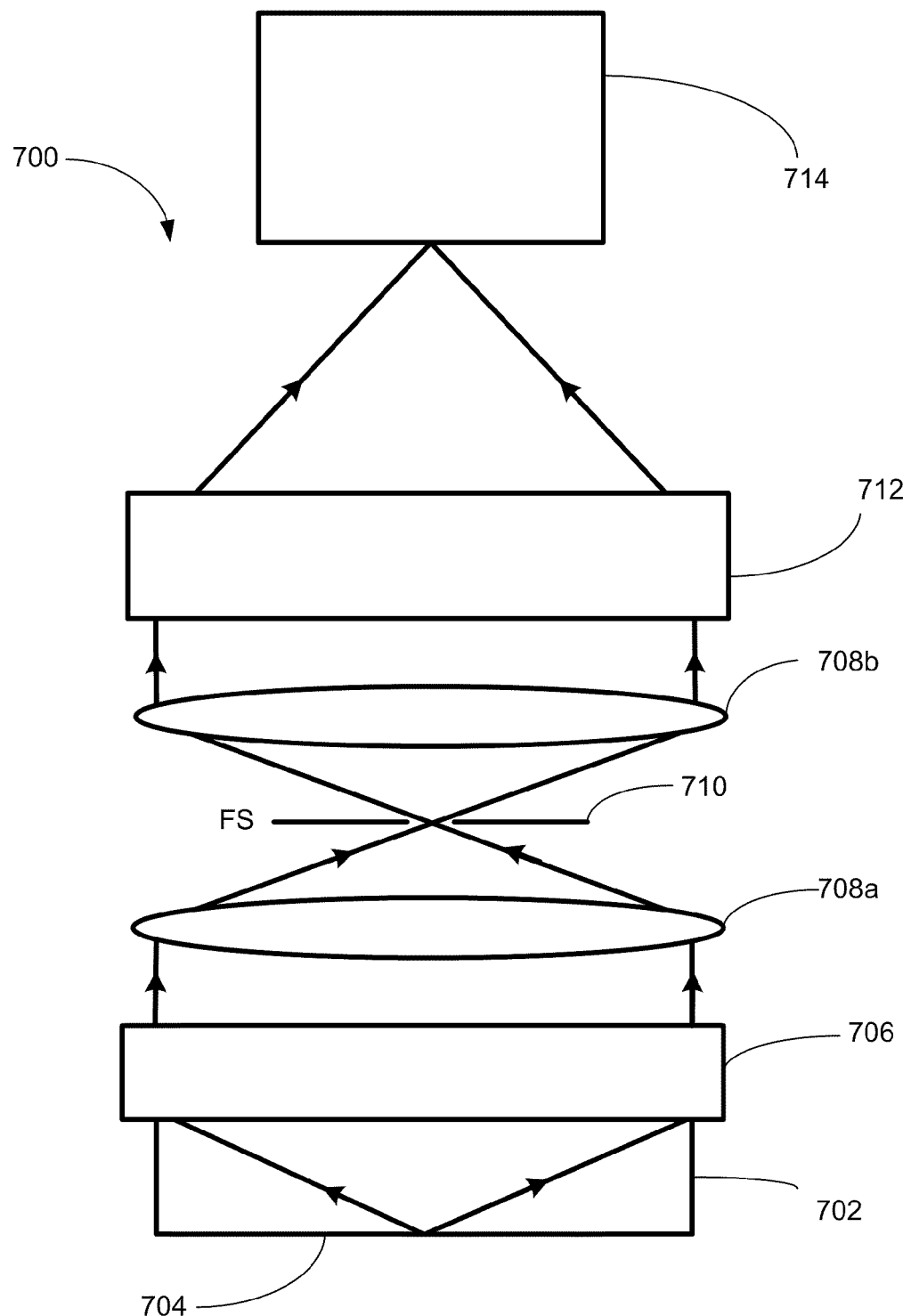
FIG. 7 is a schematic diagram of a widefield microscopy system that corrects aberrations using adaptive optics techniques.

FIG. 7 is a schematic diagram of a widefield microscopy system 700 that corrects aberrations using adaptive optics techniques. Emission light emitted from a focal plane 704 of the system 700, where the focal plane lies within a sample 702. An objective lens 706 focuses the emitted light, which may suffer aberration due to passage through the sample 702, and a pair of telescoping lenses 708a, 708b can be used to pass the focused light through a field stop 710 and to expand or reduce the waist of the beam of emission light. A wavefront modulating element 712 then applies adaptive optics techniques to the aberrated wave front before passing the emission light to a detector 714. The WME 712 can apply similar adaptive optics pupil segmentation techniques described above with respect to point-scanning microscopy, to apply individual shifts in angles of beamlets of the emission light beam from the focal plane 704, such that images formed with different parts of the wavefront can be used to reconstruct a complete diffraction-limited widefield wavefront.

Figure 8:
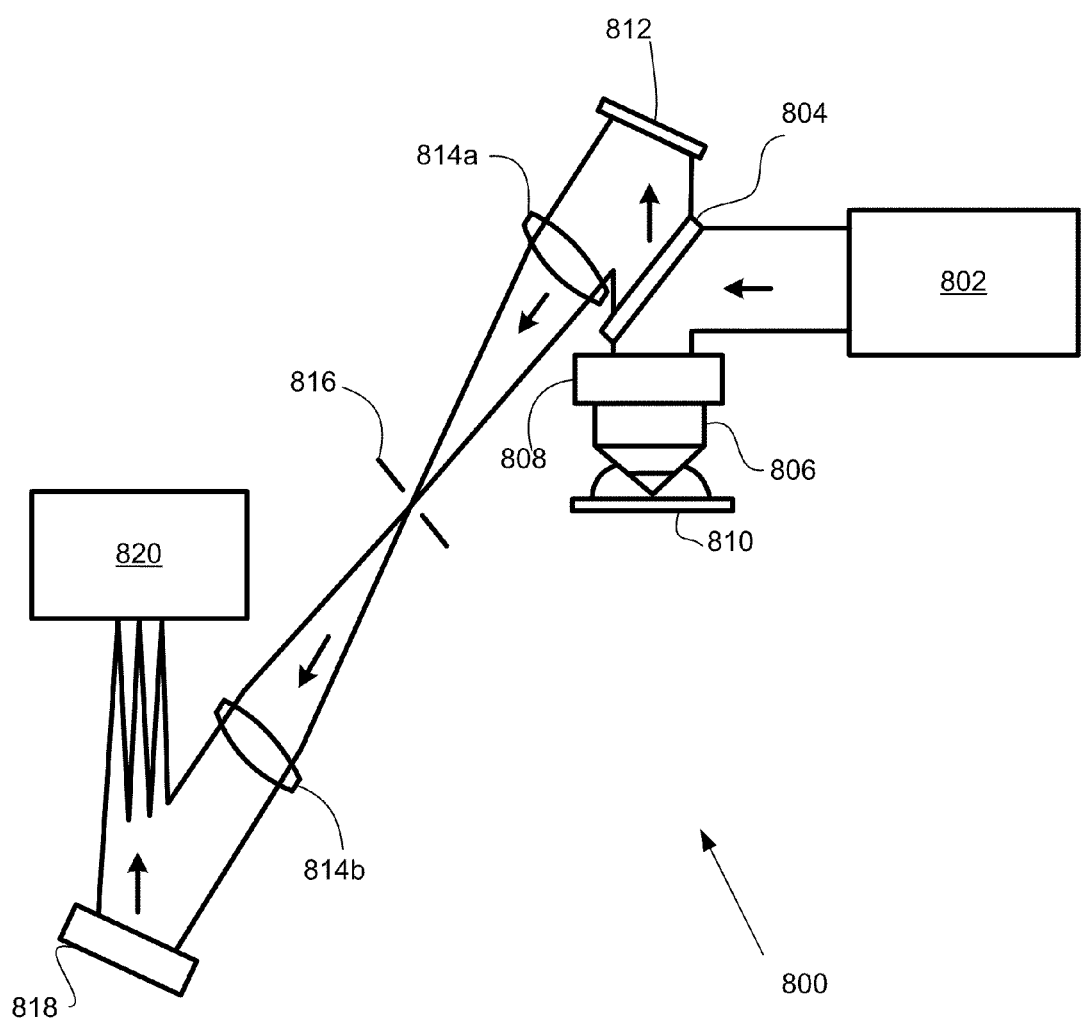
FIG. 8 is a schematic diagram of a widefield microscopy system that corrects aberrations using adaptive optics techniques.

FIG. 8 is a schematic diagram of a widefield microscopy system 800 that corrects aberrations using adaptive optics techniques and shows additional details of the system 700. A source of excitation light 802 provides excitation light that is reflected from a beam splitter 804 through an objective lens 806 mounted on a translation stage 808 into a sample 810. Emission light is emitted from the sample 810 at a focal plane of the objective 806, is focused into a beam of emission light by the objective 806, reflected off a mirror 812 toward a system of telescoping lenses 814a, 814b. The telescoping lenses 814a, 814b pass the beam of emission light through a field stop 816. As with adaptive optics used in point-scanning microscopy, described above, a wavefront modulating element 818 serves as both the wavefront sensor and the phase control device to modify individual beamlets of the beam of emission light. Emission light modulated by the WME 818 is directed toward a detector 820 (e.g., a CCD detector), which images the emission light.

In one implementation, as shown in FIG. 9A, a single Fresnel lens pattern can be applied to the WME 818. The Fresnel lens pattern then focuses the emission beam onto the detector 820 to form a single image of the sample 810, as shown in FIG. 9B. Then, as shown in FIG. 9C, an array of Fresnel lenses can be applied to different subregions of the WME 818 to segment the emission light wavefront into different individually controllable beamlets and to produce an array of images of the sample, as shown in FIG. 9D, at the image plane of the detector 820. For a perfect plane wave emission wavefront, the array of images would fall on a perfect grid. However, the deviation of each individual image from its ideal grid location can be used to measure the slope of the portion of the wavefront (and the angle of the beamlet that corresponds to that portion of the wavefront) used to create the individual image. Thus, measurement of the deviation of each individual image from its ideal grid location can be used to determine an array of wavefront slope measurements across the rear pupil of the objective 806, from which the desired corrective wavefront can be reconstructed. Applying this correction to the WME 818 and overlapping it with a single Fresnel lens pattern shown in FIG. 9A, which is used to focus the overall image onto the detector then recovers a diffraction-limited image of the sample 810 at the detector 820.

As with two-photon fluorescence microscopy, if the sample 810 does not exhibit field-position-dependent aberration, the resulting adaptive optics correction should recover diffraction-limited resolution everywhere in the field of view. If the aberration is field-dependent, an averaged correction over the entire field will be obtained, which should still improve signal and resolution. Furthermore, by analyzing the image shift using fluorescent features within different subfields of view, the field-dependent aberration can be measured, and a diffraction-limited image can be reconstructed by applying appropriate aberration patterns to each subfield of view sequentially.

Figure 10:
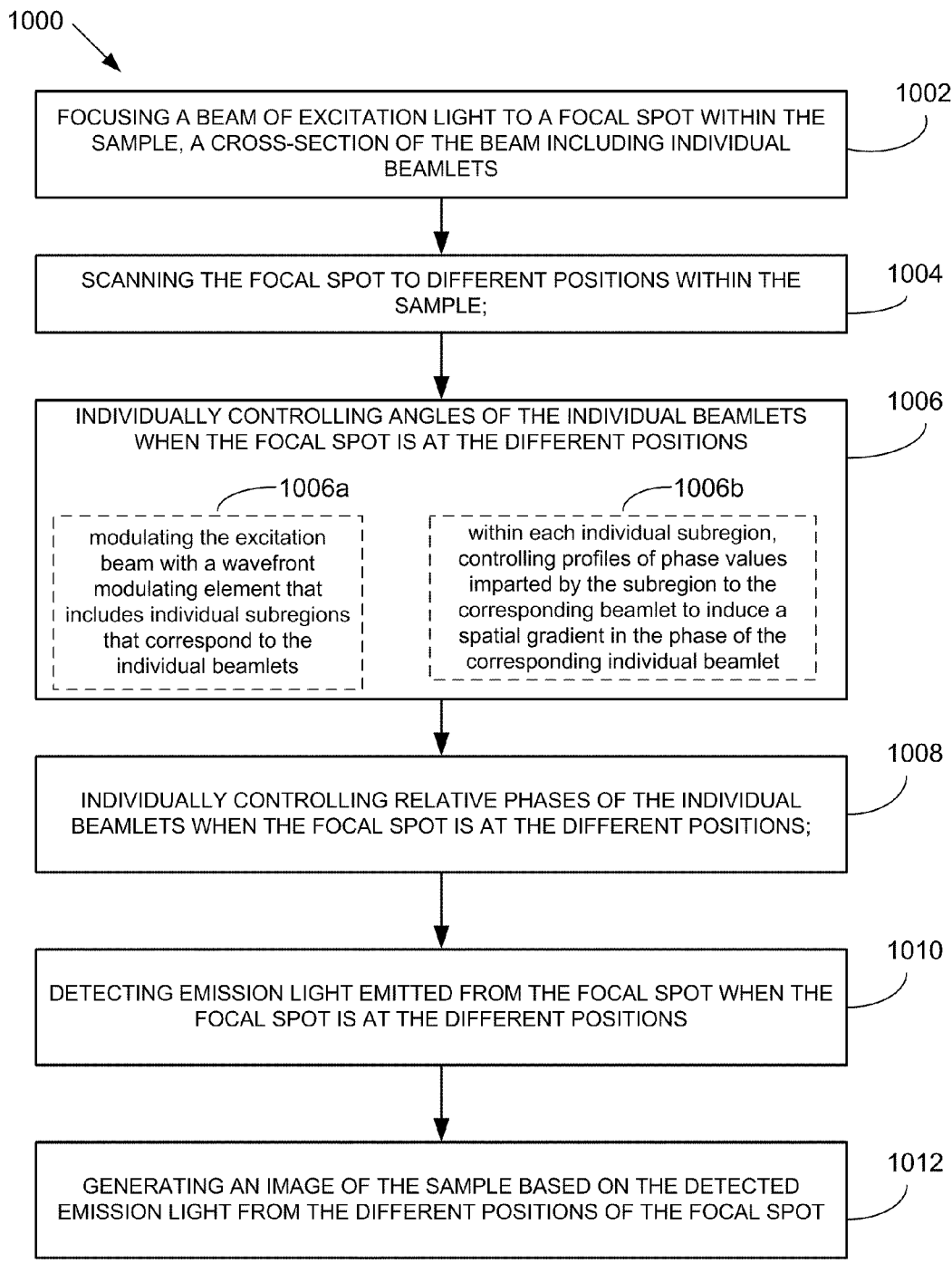
FIG. 10 is a flowchart of a process of forming an image of a sample.

FIG. 10 is a flowchart of a process 1000 of forming an image of a sample. In the process 1000, a beam of excitation light is focused to a focal spot within the sample (1002), and a cross-section of the beam includes individual beamlets. The focal spot is scanned to different positions within the sample (1004). Angles of the individual beamlets are individually controlled when the focal spot is at the different positions (1006). Individually controlling the angles of the individual beamlets can include modulating the excitation beam with a wavefront modulating element that includes individual subregions that correspond to the individual beamlets (1006a) and, within each individual subregion, controlling profiles of phase values imparted by the subregion to the corresponding beamlet to induce a spatial gradient in the phase of the corresponding individual beamlet (1006b).

The profiles of phase values can be determined by observing shifts in positions images of an object formed by illuminating the object with individual beamlets. For example, a reference object in the sample can be illuminated with different beamlets of the excitation beam, where the different beamlets are modulated by different corresponding subregions of the wavefront modulating element. Emission light from the reference object can be detected when the reference object is illuminated by the different beamlets, and positions of the reference object in the sample can be determined based on the emission light detected when the reference object is illuminated by the different beamlets. Based on the determined positions, determinations can be made of beamlet-angle-correcting profiles of phase values to be imparted by each subregion to the subregion's corresponding beamlet to induce a spatial gradient in the phase of the corresponding beamlet, such that the positions would be substantially identical to each other when the beamlets include the spatial gradients in the phase.

Relative phases of the individual beamlets are individually controlled when the focal spot is at the different positions (1008). For example, relative phases between the beamlets at the wavefront modulation element that would result in constructive interference between the beamlets at the focal spot can be determined based on the beamlet-angle-correcting profiles of phase values. Emission light emitted from the focal spot is detected when the focal spot is at the different positions (1010). An image of the sample based on the detected emission light from the different positions of the focal spot (1012).

Figure 11:
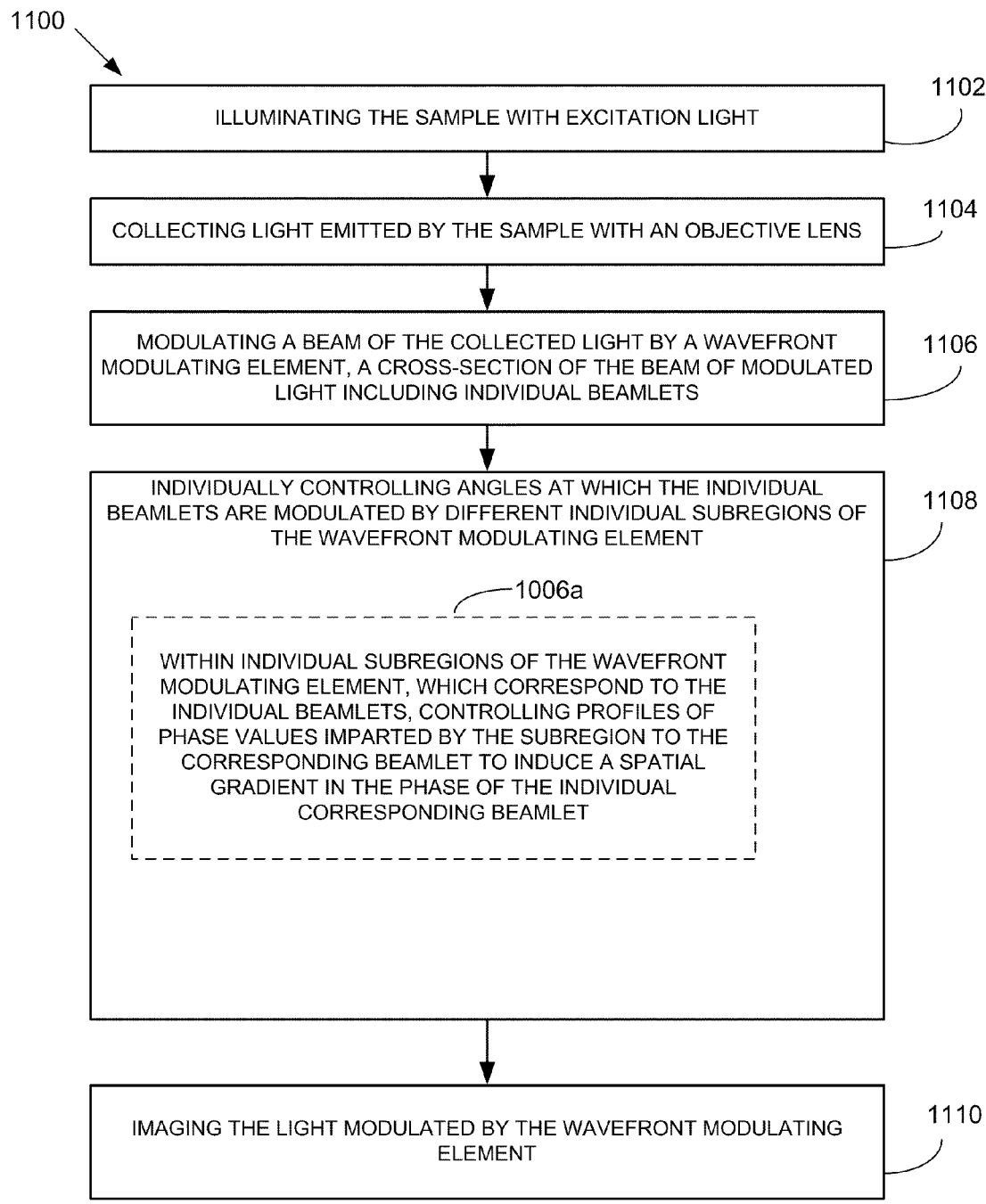
FIG. 11 is a flowchart of a process of forming an image of a sample.

FIG. 11 is a flowchart of a process 1100 of forming an image of a sample. In the process 1100, the sample is illuminated with excitation light (1102), and light emitted by the sample is collected with an objective lens (1104). A beam of the collected light is modulated by a wavefront modulating element, where a cross-section of the beam of modulated light including individual beamlets (1106). Angles at which the individual beamlets are modulated are individually controlled by different individual subregions of the wavefront modulating element (1108). Individually controlling the angles of the individual beamlets can include, within individual subregions of the wavefront modulating element, which correspond to the individual beamlets, controlling profiles of phase values imparted by the subregion to the corresponding beamlet to induce a spatial gradient in the phase of the individual corresponding beamlet (1108b). The light modulated by the wavefront modulating element is imaged (1110).

The profiles of phase values with which the beamlets are modulated by the individual subregions can be determined by imparting a pattern of Fresnel lenses on the wavefront modulating element, where the different Fresnel lenses imparted on the different subregions of the wavefront modulating element. A reference object in the sample with excitation light can be illuminated, and light emitted by the reference object can be collected while the pattern of Fresnel lenses is imparted to the wavefront modulating element. A beam of the collected light can be modulated with the wavefront modulating element while the pattern of Fresnel lenses is imparted, where a cross-section of the beam of modulated collected light including individual beamlets. The collected modulated light can be imaged, and positions of features in a pattern of images of the reference object in the imaged light can be compared to positions features of an ideal pattern of images of the reference object. Based on the comparison a profile of phase values that would reduce differences between the two patterns can be determined.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method of forming an image of a sample, the method comprising:
    focusing a beam of excitation light to a focal spot within the sample, a cross-section of the beam including individual beamlets;
    scanning the focal spot to different positions within the sample;
    individually controlling angles of the individual beamlets when the focal spot is at the different positions, wherein individually controlling angles of the individual beamlets includes:
        modulating the excitation beam with a wavefront modulating element that includes individual subregions that correspond to the individual beamlets; and
        within each individual subregion, controlling profiles of phase values imparted by the subregion to the corresponding beamlet to induce a spatial gradient in the phase of the corresponding individual beamlet;
    individually controlling relative phases of the individual beamlets when the focal spot is at the different positions, such that the individual beamlets interfere constructively with each other within the focal spot;
    detecting emission light emitted from the focal spot when the focal spot is at the different positions; and
    generating an image of the sample based on the detected emission light from the different positions of the focal spot.

2. The method of claim 1, wherein the different positions are located within a plane of the sample.

3. The method of claim 2, wherein the plane is non-perpendicular to an axis of the excitation beam in the sample.

4. The method of claim 1, wherein the excitation light has a first wavelength and the emission light has a second wavelength that is less than the first wavelength.

5. The method of claim 1, wherein the wavefront modulating element includes a spatial light modulator and further comprising applying a global phrase ramp to light reflected from an active layer of the spatial light modulator to induce a non-zero angle between light reflected from a front surface of the spatial light modulator and light reflected from the active layer.

6. The method of claim 1, further comprising determining the profiles of phase values, wherein the determining includes:
    illuminating a reference object in the sample with different beamlets of the excitation beam, the different beamlets being modulated by different corresponding subregions of the wavefront modulating element;
    detecting emission light from the reference object when the reference object is illuminated by the different beamlets;
    determining positions of the reference object in the sample based on the emission light detected when the reference object is illuminated by the different beamlets;
    based on the determined positions, determining beamlet-angle-correcting profiles of phase values to be imparted by each subregion to the subregion's corresponding beamlet to induce a spatial gradient in the phase of the corresponding beamlet, such that the positions would be substantially identical to each other when the beamlets include the spatial gradients in the phase.

7. The method of claim 6, wherein the reference object is a fluorescent bead.

8. The method of claim 6, wherein determining the profiles of phase values further includes:
    based on the beamlet-angle-correcting profiles of phase values, determining relative phases between the beamlets at the wavefront modulation element that would result in constructive interference between the beamlets at the focal spot.

9. The method of claim 1, further comprising determining the profiles of phase values, wherein the determining includes:
    illuminating a reference object in the sample with a reference beamlet that is modulated by a reference subregion of the wavefront modulating element;
    successively permitting different beamlets modulated by different individual subregions of the wavefront modulating element to illuminate the reference object;
    for each beamlet, determining profiles of phase values to be imparted to the beamlet by the beamlet's corresponding subregion to induce a relative phase between the beamlet and the reference beamlet that would result in constructive interference between the beamlet and the reference beamlet at the focal spot.

10. The method of claim 1, further comprising determining the profiles of phase values, wherein the determining includes:
    in a plurality of beamlets, for each beamlet corresponding to a subregion of the wavefront modulation element:
        illuminating a reference object in the sample with the beamlet;
        detecting emission light from the reference object in the sample when the reference object is illuminated by the beamlet;
        determining a position of the reference object in the sample based on the detected emission light;
    based on the determined positions, determining beamlet-angle-correcting profiles of phase values to be imparted by each subregion to the subregion's corresponding beamlet to induce a spatial gradient in the phase of the corresponding beamlet, such that when the beamlets include the spatial gradient in the phase the beamlets intersect at a focal spot in the sample having a smaller size than a focal spot formed when the beamlets do not include the spatial gradient in the phase.

11. The method of claim 10, wherein determining the profiles of phase values further includes:
    based on the beamlet-angle-correcting profiles of phase values, determining relative phases between the beamlets at the wavefront modulation element that would result in constructive interference between the beamlets at the focal spot.

12. A microscope system comprising:
    a light source configured to emit excitation light;
    focusing elements configured to focus a beam of the excitation light to a focal spot within a sample, a cross-section of excitation beam including individual beamlets;
    scanning elements configured to scan the focal spot to different positions within the sample;
    a wavefront modulating element configured to modulate the excitation light and to control angles and relative phases of the individual beamlets when the focal spot is at the different positions, wherein the wavefront modulating element is configured to control the relative phases of the individual beamlets such that the individual beamlets interfere constructively with each other within the focal spot, and wherein the wavefront modulating element is configured to control angles of the individual beamlets by, within individual subregions of the wavefront modulating element, which correspond to the individual beamlets, controlling profiles of phase values imparted by the subregion to the corresponding beamlet to induce a spatial gradient in the phase of the individual corresponding beamlet;

a detector configured to detect emission light emitted from the focal spot when the focal spot is at the different positions; and a processor configured to generate an image of the sample based on the detected emission light from the different positions of the focal spot.

13. The microscope system of claim 12, wherein the different positions are located within a plane of the sample.

14. The microscope system of claim 12, wherein the plane is non-perpendicular to an axis of the excitation beam in the sample.

15. The microscope system of claim 12, wherein the excitation light has a first wavelength and the emission light has a second wavelength that is less than the first wavelength.

16. The microscope system of claim 12, wherein the wavefront modulating element includes a spatial light modulator configured to apply a global phrase ramp to light reflected from an active layer of the spatial light modulator to induce a non-zero angle between light reflected from a front surface of the spatial light modulator and light reflected from the active layer.

17. The microscope system of claim 12, wherein the wavefront modulating element is further configured to modulate directions of individual beamlets into directions that do not reach the sample, such that a reference object in the sample may be illuminated with remaining different individual beamlets of the excitation beam, the different beamlets being modulated by different corresponding subregions of the wavefront modulating element, and such that emission light from the reference object in the sample can be detected when the reference object is illuminated by the different beamlets, the microscope system further comprising:

one or more processors configured to determine the profiles of the phase values by:

determining positions of the reference object in the sample based on the emission light detected when the reference object is illuminated by the different beamlets; and based on the determined positions, determining beamlet-angle-correcting profiles of phase values to be imparted by each subregion to the subregion's corresponding beamlet to induce a spatial gradient in the phase of the corresponding beamlet, such that the positions would be substantially identical to each other.

18. The microscope system of claim 17, further comprising a field stop located along a path of the excitation beam between the wavefront modulating element and the sample and configured to block the beamlets of excitation light that are modulated into directions that do not reach the sample.

19. The microscope system of claim 17, wherein determining the profiles of phase values further includes, based on the beamlet-angle-correcting profiles of phase values, determining relative phases between the beamlets at the wavefront modulation element that would result in constructive interference between the beamlets at the focal spot.

20. The microscope system of claim 17, wherein the wavefront modulating element is further configured to modulate directions of individual beamlets into directions that do not reach the sample, such that a reference object in the sample may be illuminated with remaining different individual beamlets of the excitation beam, the different beamlets being modulated by different corresponding subregions of the wavefront modulating element, and such that emission light from the reference object in the sample can be detected when the reference object is illuminated by the different beamlets, the microscope system further comprising:

one or more processors configured to determine the profiles of the phase values by:

for each different individual beamlet, determining profiles of phase values to be imparted to the beamlet by the beamlet's corresponding subregion to induce a relative phase between the beamlet and the reference beamlet that would result in constructive interference at the focal spot between the individual beamlet and the reference beamlet.

21. A method of forming an image of a sample, the method comprising:

illuminating the sample with excitation light;

collecting light emitted by the sample at a focal plane of an objective lens;

imaging the collected light onto a detector;

modulating a beam of the collected light by a wavefront modulating element, a cross-section of the beam of modulated light including individual beamlets, wherein each beamlet is aberrated by an amount determined by a path of the individual beamlet from the focal plane to the wavefront modulating element;

individually controlling angles at which the individual beamlets are reflected by different individual subregions of the wavefront modulating element, wherein the angle at which a beamlet is reflected is controlled to compensate for the aberration of the beamlet, such that the beam of collected light is imaged as a plane wave onto the detector, wherein individually controlling angles of the individual beamlets includes:

within individual subregions of the wavefront modulating element, which correspond to the individual beamlets, controlling profiles of phase values imparted by the subregion to the corresponding beamlet to induce a spatial gradient in the phase of the individual corresponding beamlet;

imaging the light modulated by the wavefront modulating element.

22. The method of claim 21, wherein the wavefront modulating element includes a spatial light modulator and further comprising applying a global phrase ramp to light reflected from an active layer of the spatial light modulator to induce a non-zero angle between light reflected from a front surface of the spatial light modulator and light reflected from the active layer.

23. The method of claim 21, further comprising determining the profiles of phase values with which the beamlets are modulated by the individual subregions, wherein the determining includes:

imparting a pattern of Fresnel lenses on the wavefront modulating element, the different Fresnel lenses imparted on the different subregions of the wavefront modulating element;

illuminating a reference object in the sample with excitation light;

collecting light emitted by the reference object while the pattern of Fresnel lenses is imparted to the wavefront modulating element;

modulating a beam of the collected light with the wavefront modulating element while the pattern of Fresnel lenses is imparted, a cross-section of the beam of modulated collected light including individual beamlets;

imaging the collected modulated light;

comparing positions of features in a pattern of images of the reference object in the imaged light to positions features of an ideal pattern of images of the reference object; and based on the comparison determining a profile of phase values that would reduce differences between the two patterns.

24. A microscope system comprising:

a source of excitation light configured to illuminate a sample;

a detector configured to image light;

collection optics configured to collect light emitted by the sample at a focal plane of the collection optics and to image the collected light onto the detector;

a wavefront modulating element configured to modulate a beam of the collected light, a cross-section of the beam of modulated light including individual beamlets, wherein each beamlet is aberrated by an amount determined by a path of the individual beamlet from the focal plane to the wavefront modulating element, the wavefront modulating element being configured to individually control angles at which the individual beamlets are reflected from different individual subregions of the wavefront modulating element, wherein the angle at which a beamlet is reflected is controlled to compensate for the aberration of the beamlet, such that the beam of collected light is imaged as a plane wave onto the detector, wherein individually controlling angles of the individual beamlets by the wavefront modulating element includes:

within individual subregions of the wavefront modulating element, which correspond to the individual beamlets, controlling profiles of phase values imparted by the subregion to the corresponding beamlet to induce a spatial gradient in the phase of the individual corresponding beamlet.

25. The microscope system of claim 24, wherein the wavefront modulating element includes a spatial light modulator that is configured to apply a global phrase ramp to light reflected from an active layer of the spatial light modulator to induce a non-zero angle between light reflected from a front surface of the spatial light modulator and light reflected from the active layer.

26. The microscope system of claim 24, further comprising one or more processors configured to determine the profiles of phase values imparted by the subregions wherein the determining includes:

imparting a pattern of Fresnel lenses on the wavefront modulating element, the different Fresnel lenses imparted on the different subregions of the wavefront modulating element;

illuminating a reference object in the sample with excitation light;

collecting light emitted by the reference object while the pattern of Fresnel lenses is imparted to the wavefront modulating element;

modulating a beam of the collected light with the wavefront modulating element while the pattern of Fresnel lenses is imparted, a cross-section of the beam of modulated collected light including individual beamlets;

imaging the collected modulated light;

comparing positions of features in a pattern of images of the reference object in the imaged light to positions features of an ideal pattern of images of the reference object; and based on the comparison determining a profile of phase values that would reduce differences between the two patterns.

* * * * *